(12) United States Patent
Wehrmeister et al.

(10) Patent No.: US 8,636,455 B2
(45) Date of Patent: Jan. 28, 2014

(54) INSTALLABLE ASSEMBLY HAVING AN EXPANDABLE OUTER MEMBER AND A FASTENER WITH A MANDREL

(75) Inventors: Mark Wehrmeister, Seattle, WA (US); Doug Bakken, Seattle, WA (US); Mark Weiss, Seattle, WA (US)

(73) Assignee: Fatigue Technoloy, Inc., Seattle, WA (US)

( * ) Notice: Subject to any disclaimer, the term of this patent is extended or adjusted under 35 U.S.C. 154(b) by 409 days.

(21) Appl. No.: 12/757,860

(22) Filed: Apr. 9, 2010

(65) Prior Publication Data
US 2010/0260572 A1    Oct. 14, 2010

Related U.S. Application Data

(60) Provisional application No. 61/168,544, filed on Apr. 10, 2009.

(51) Int. Cl.
*F16B 19/00* (2006.01)

(52) U.S. Cl.
USPC ............................................ 411/361; 411/45

(58) Field of Classification Search
USPC ............... 411/43–45, 54.1, 56, 70, 360, 361; 29/523
See application file for complete search history.

(56) References Cited

U.S. PATENT DOCUMENTS

| | | | |
|---|---|---|---|
| 295,593 A | 3/1884 | Thayer | |
| 810,430 A | 1/1906 | Pfluger et al. | |
| 1,081,496 A | 12/1913 | Gillmor | |
| 1,106,964 A | 8/1914 | Pahler | |
| 1,226,090 A | 5/1917 | Ludlum | |
| 1,297,142 A | 3/1919 | Gibbons | |
| 1,480,298 A | 1/1924 | Pearson | |
| 1,881,867 A | 10/1932 | Nelson | |
| 1,979,686 A | 11/1934 | Hall et al. | |
| 2,092,358 A | 9/1937 | Robertson | |
| 2,146,461 A | 2/1939 | Bettington | |
| 2,150,361 A | 3/1939 | Chobert | |
| 2,188,596 A | 1/1940 | Hobert | |
| 2,275,451 A | 3/1942 | Maxwell | |
| 2,282,711 A | 5/1942 | Eklund | |

(Continued)

FOREIGN PATENT DOCUMENTS

| DE | 2203217 | 7/1973 |
|---|---|---|
| DE | 3301849 C1 | 7/1984 |

(Continued)

OTHER PUBLICATIONS

Merriam Webster's Collegiate Dictionary, Tenth Edition, 1997, p. 154.

*Primary Examiner* — Gary Estremsky
(74) *Attorney, Agent, or Firm* — Seed IP Law Group PLLC

(57) ABSTRACT

A fastener assembly is installable in an opening of a workpiece and includes an outer member and a fastener. The fastener is movable through a passageway of the outer member. The fastener includes a mandrel and a stem. The mandrel is dimensioned to radially expand the outer member. The stem has an expansion portion and a propping portion. The expansion portion radially expands the outer member after the outer member has been expanded by the mandrel. The propping portion keeps the expanded outer member in an installed expanded configuration. The outer member and fastener are installed in a single operation to reduce installation time.

13 Claims, 20 Drawing Sheets

(56) References Cited

U.S. PATENT DOCUMENTS

| | | | |
|---|---|---|---|
| 2,357,123 A | 8/1944 | Maxwell | |
| 2,385,294 A | 9/1945 | Lowy | |
| 2,405,399 A | 8/1946 | Bugg et al. | |
| 2,430,554 A | 11/1947 | Bugg et al. | |
| 2,433,425 A | 12/1947 | Burckle | |
| 2,468,985 A | 5/1949 | Krotz | |
| 2,501,567 A * | 3/1950 | Huck | 411/39 |
| 2,528,180 A | 10/1950 | Roehl | |
| 2,538,623 A * | 1/1951 | Keating | 411/43 |
| 2,583,719 A | 1/1952 | White | |
| 2,608,751 A | 9/1952 | Hutton | |
| 2,661,182 A | 12/1953 | Kipp | |
| 2,672,175 A | 3/1954 | Howard | |
| 2,695,446 A | 11/1954 | Meyer | |
| 2,700,172 A | 1/1955 | Rohe | |
| 2,808,643 A | 10/1957 | Weatherhead, Jr. | |
| 2,887,003 A | 5/1959 | Brilmyer | |
| 2,943,667 A | 7/1960 | Ewing et al. | |
| 3,107,572 A | 10/1963 | Orloff | |
| 3,128,999 A | 4/1964 | Schmitt | |
| 3,129,630 A | 4/1964 | Wing et al. | |
| 3,137,887 A | 6/1964 | Mannino et al. | |
| 3,149,860 A | 9/1964 | Hallesy | |
| 3,164,054 A | 1/1965 | Biesecker | |
| 3,222,977 A | 12/1965 | Vaughn | |
| 3,244,034 A | 4/1966 | Severdia | |
| 3,252,493 A | 5/1966 | Smith | |
| 3,262,353 A | 7/1966 | Waeltz et al. | |
| 3,290,770 A | 12/1966 | Silverman et al. | |
| 3,345,730 A | 10/1967 | Laverty | |
| 3,358,492 A | 12/1967 | Richter | |
| 3,377,907 A * | 4/1968 | Hurd | 411/70 |
| 3,399,435 A | 9/1968 | Ackerman | |
| 3,434,746 A | 3/1969 | Watts | |
| 3,443,474 A | 5/1969 | Blakeley et al. | |
| 3,498,648 A | 3/1970 | Hallesy | |
| 3,537,163 A | 11/1970 | Steidl | |
| 3,566,662 A | 3/1971 | Champoux | |
| 3,578,367 A * | 5/1971 | Harvill et al. | 403/408.1 |
| 3,596,948 A | 8/1971 | Spoehr | |
| 3,601,771 A | 8/1971 | Dozier | |
| 3,643,544 A | 2/1972 | Massa | |
| 3,657,956 A | 4/1972 | Bradley et al. | |
| 3,674,292 A | 7/1972 | Demler, Sr. | |
| 3,677,684 A | 7/1972 | Platz | |
| 3,678,535 A | 7/1972 | Charles | |
| 3,693,247 A | 9/1972 | Brown | |
| 3,695,324 A | 10/1972 | Gulistan | |
| 3,763,541 A | 10/1973 | Jaffe | |
| 3,765,078 A | 10/1973 | Gulistan | |
| 3,778,090 A | 12/1973 | Tobin | |
| 3,787,945 A | 1/1974 | Pasek et al. | |
| 3,820,297 A | 6/1974 | Hurd | |
| 3,835,525 A | 9/1974 | King, Jr. | |
| 3,835,688 A | 9/1974 | King, Jr. | |
| 3,837,208 A | 9/1974 | Davis et al. | |
| 3,875,649 A | 4/1975 | King, Jr. | |
| 3,878,760 A | 4/1975 | Jeal et al. | |
| 3,879,980 A | 4/1975 | King, Jr. | |
| 3,892,121 A | 7/1975 | Champoux et al. | |
| 3,895,409 A | 7/1975 | Kwatonowski | |
| 3,915,052 A | 10/1975 | Ruhl | |
| 3,934,325 A | 1/1976 | Jaffe | |
| 3,943,748 A | 3/1976 | King, Jr. | |
| 3,949,535 A | 4/1976 | King, Jr. | |
| 3,997,193 A | 12/1976 | Tsuda et al. | |
| 4,003,288 A | 1/1977 | Jeal | |
| 4,044,591 A | 8/1977 | Powderley | |
| 4,089,247 A | 5/1978 | Dahl et al. | |
| 4,142,439 A | 3/1979 | Landt | |
| 4,143,580 A | 3/1979 | Luhm | |
| 4,157,675 A * | 6/1979 | King, Jr. | 411/500 |
| 4,164,807 A | 8/1979 | King, Jr. | |
| 4,168,650 A | 9/1979 | Dahl et al. | |
| 4,186,787 A | 2/1980 | Husain | |
| 4,187,708 A | 2/1980 | Champoux | |
| 4,230,017 A * | 10/1980 | Angelosanto | 411/34 |
| 4,237,768 A | 12/1980 | Volkmann | |
| 4,249,786 A | 2/1981 | Mahoff | |
| 4,295,691 A | 10/1981 | Rubenthaler | |
| 4,355,612 A | 10/1982 | Luksch | |
| 4,364,697 A | 12/1982 | Binns | |
| 4,370,081 A | 1/1983 | Briles | |
| 4,371,154 A | 2/1983 | Winbigler | |
| 4,386,515 A | 6/1983 | Starke | |
| 4,397,061 A | 8/1983 | Kanzaka | |
| 4,405,256 A | 9/1983 | King, Jr. | |
| 4,423,619 A | 1/1984 | Champoux | |
| 4,425,780 A | 1/1984 | Champoux | |
| 4,447,944 A | 5/1984 | Mohrman | |
| 4,457,652 A | 7/1984 | Pratt | |
| 4,471,643 A | 9/1984 | Champoux et al. | |
| 4,482,089 A | 11/1984 | Lindahl et al. | |
| 4,491,358 A | 1/1985 | Choung | |
| 4,494,398 A | 1/1985 | Svoboda | |
| 4,522,378 A | 6/1985 | Nelson | |
| 4,524,600 A | 6/1985 | Champoux et al. | |
| 4,530,527 A | 7/1985 | Holmberg | |
| 4,557,033 A | 12/1985 | Champoux | |
| 4,557,650 A | 12/1985 | Molina | |
| 4,579,491 A | 4/1986 | Kull | |
| 4,583,388 A | 4/1986 | Hogenhout | |
| 4,595,324 A | 6/1986 | Sadri | |
| 4,597,282 A | 7/1986 | Hogenhout | |
| 4,609,315 A | 9/1986 | Briles | |
| 4,627,775 A * | 12/1986 | Dixon | 411/34 |
| 4,640,479 A | 2/1987 | Shely et al. | |
| 4,659,271 A | 4/1987 | Pratt et al. | |
| 4,659,272 A | 4/1987 | Pratt | |
| 4,665,732 A | 5/1987 | Hogenhout | |
| 4,678,384 A * | 7/1987 | Sparling et al. | 411/43 |
| 4,699,212 A | 10/1987 | Andersson et al. | |
| 4,699,552 A | 10/1987 | Jeal | |
| 4,702,655 A * | 10/1987 | Kendall | 411/43 |
| 4,732,518 A | 3/1988 | Toosky | |
| 4,752,169 A | 6/1988 | Pratt | |
| 4,755,904 A | 7/1988 | Brick | |
| 4,759,237 A | 7/1988 | Fauchet et al. | |
| 4,787,793 A | 11/1988 | Harris | |
| 4,809,420 A | 3/1989 | Landy et al. | |
| 4,832,548 A | 5/1989 | Strobel | |
| 4,869,091 A | 9/1989 | Shemeta | |
| 4,872,332 A | 10/1989 | Potzas | |
| 4,877,363 A | 10/1989 | Williamson et al. | |
| 4,885,829 A | 12/1989 | Landy | |
| 4,900,205 A | 2/1990 | Sadri | |
| 4,905,766 A | 3/1990 | Dietz et al. | |
| 4,934,038 A | 6/1990 | Caudill | |
| 4,934,170 A | 6/1990 | Easterbrook et al. | |
| 4,950,115 A | 8/1990 | Sadri | |
| 4,967,463 A | 11/1990 | Pratt | |
| 4,985,979 A | 1/1991 | Speakman | |
| 4,999,896 A | 3/1991 | Mangus et al. | |
| 5,025,128 A * | 6/1991 | Derbyshire | 219/200 |
| 5,038,596 A | 8/1991 | Noonan et al. | |
| 5,066,179 A | 11/1991 | Pratt | |
| 5,069,586 A | 12/1991 | Casey | |
| 5,083,363 A | 1/1992 | Ransom et al. | |
| 5,093,957 A | 3/1992 | Do | |
| 5,096,349 A | 3/1992 | Landy et al. | |
| 5,103,548 A | 4/1992 | Reid et al. | |
| 5,110,163 A | 5/1992 | Benson et al. | |
| 5,123,792 A | 6/1992 | Strobel | |
| 5,127,254 A | 7/1992 | Copple et al. | |
| 5,129,253 A | 7/1992 | Austin et al. | |
| 5,178,502 A | 1/1993 | Sadri | |
| 5,207,461 A | 5/1993 | Lasko | |
| 5,213,460 A | 5/1993 | Sadri et al. | |
| 5,218,854 A | 6/1993 | Jarzebowicz et al. | |
| 5,238,342 A | 8/1993 | Stencel | |
| 5,245,743 A | 9/1993 | Landy et al. | |
| 5,253,773 A | 10/1993 | Choma et al. | |
| 5,256,017 A | 10/1993 | Smirnov et al. | |
| 5,305,627 A | 4/1994 | Quincey et al. | |

(56) References Cited

U.S. PATENT DOCUMENTS

| | | | |
|---|---|---|---|
| 5,341,559 A | 8/1994 | Reid et al. |
| 5,350,266 A | 9/1994 | Espey et al. |
| 5,380,111 A | 1/1995 | Westrom |
| 5,380,136 A | 1/1995 | Copple et al. |
| 5,390,808 A | 2/1995 | Choma et al. |
| 5,399,052 A | 3/1995 | Volkmann et al. |
| 5,405,228 A | 4/1995 | Reid et al. |
| 5,433,100 A | 7/1995 | Easterbrook et al. |
| 5,466,016 A | 11/1995 | Briody et al. |
| 5,468,104 A | 11/1995 | Reid et al. |
| 5,478,122 A | 12/1995 | Seabra |
| 5,496,140 A | 3/1996 | Gossmann et al. |
| 5,498,110 A | 3/1996 | Stencel et al. |
| 5,607,194 A | 3/1997 | Ridenour |
| 5,609,434 A | 3/1997 | Yehezkieli et al. |
| 5,632,582 A | 5/1997 | Gauron |
| 5,634,751 A | 6/1997 | Stencel et al. |
| 5,666,710 A | 9/1997 | Weber et al. |
| 5,702,215 A | 12/1997 | Li |
| 5,713,611 A | 2/1998 | Kurimoto et al. |
| 5,722,312 A | 3/1998 | Kristensen |
| 5,806,173 A | 9/1998 | Honma et al. |
| 5,813,808 A | 9/1998 | Wu |
| 5,816,761 A | 10/1998 | Cassatt et al. |
| 5,860,213 A | 1/1999 | Knudson |
| 5,885,318 A | 3/1999 | Shimizu et al. |
| 5,943,898 A | 8/1999 | Kuo |
| 5,947,326 A | 9/1999 | O'Hern et al. |
| 5,947,667 A | 9/1999 | Cassatt et al. |
| 6,036,418 A | 3/2000 | Stencel et al. |
| 6,058,562 A | 5/2000 | Satou et al. |
| 6,077,009 A * | 6/2000 | Hazelman ............... 411/43 |
| 6,077,010 A | 6/2000 | Reid et al. |
| 6,131,964 A | 10/2000 | Sareshwala |
| 6,183,180 B1 | 2/2001 | Copple et al. |
| 6,217,082 B1 | 4/2001 | Orcutt et al. |
| 6,266,991 B1 | 7/2001 | Kuo |
| 6,289,577 B1 | 9/2001 | Tanaka et al. |
| 6,325,582 B1 | 12/2001 | Sadri et al. |
| 6,328,513 B1 | 12/2001 | Niwa et al. |
| 6,347,663 B1 | 2/2002 | Hunzinger et al. |
| 6,487,767 B1 | 12/2002 | Reid et al. |
| 6,488,460 B1 | 12/2002 | Smith et al. |
| 6,499,926 B2 | 12/2002 | Keener |
| 6,537,005 B1 | 3/2003 | Denham |
| 6,623,048 B2 | 9/2003 | Castel et al. |
| 6,651,301 B1 | 11/2003 | Liu |
| 6,705,149 B2 | 3/2004 | Cobzaru et al. |
| 6,761,380 B2 | 7/2004 | Pachciarz et al. |
| 6,773,039 B2 | 8/2004 | Muenster et al. |
| 6,796,765 B2 | 9/2004 | Kosel et al. |
| 6,826,820 B2 | 12/2004 | Denham et al. |
| RE38,788 E | 9/2005 | Satou et al. |
| 6,990,722 B2 | 1/2006 | Reid et al. |
| 7,024,908 B2 | 4/2006 | Poast et al. |
| 7,024,909 B2 | 4/2006 | Cobzaru et al. |
| 7,047,596 B2 | 5/2006 | Sucic et al. |
| 7,059,816 B2 | 6/2006 | Toosky |
| 7,100,264 B2 | 9/2006 | Skinner et al. |
| 7,127,792 B2 | 10/2006 | Wakamori et al. |
| 7,156,051 B2 | 1/2007 | Lorton et al. |
| 7,273,338 B2 | 9/2007 | Summerlin |
| 7,303,366 B2 * | 12/2007 | Smith ............... 411/43 |
| 7,325,796 B2 | 2/2008 | Moreland |
| 7,375,277 B1 | 5/2008 | Skinner et al. |
| 7,406,777 B2 | 8/2008 | Grover et al. |
| 7,448,652 B2 | 11/2008 | Poast et al. |
| 7,509,829 B2 | 3/2009 | Johnson |
| 7,575,404 B2 | 8/2009 | Toosky et al. |
| 7,617,712 B2 | 11/2009 | Glenn |
| 7,641,430 B2 | 1/2010 | Johnson et al. |
| 7,695,226 B2 | 4/2010 | March et al. |
| 7,926,318 B2 | 4/2011 | Glenn |
| 7,926,319 B2 | 4/2011 | Johnson |
| 8,069,699 B2 | 12/2011 | Glenn et al. |
| 8,191,395 B2 | 6/2012 | Glenn |
| 8,297,897 B2 | 10/2012 | Auriol et al. |
| 8,322,015 B2 | 12/2012 | Pratt et al. |
| 8,348,566 B2 | 1/2013 | Pratt |
| 2003/0110618 A1 | 6/2003 | Magnuson |
| 2004/0111864 A1 | 6/2004 | Skinner et al. |
| 2004/0213492 A1 | 10/2004 | Kim et al. |
| 2006/0045649 A1 | 3/2006 | Johnson et al. |
| 2006/0251490 A1 | 11/2006 | Kleinman et al. |
| 2007/0110541 A1 | 5/2007 | Rawlins et al. |
| 2007/0224016 A1 | 9/2007 | Toosky et al. |
| 2007/0266756 A1 | 11/2007 | Shuster et al. |
| 2007/0289351 A1 | 12/2007 | Glenn |
| 2008/0005887 A1 | 1/2008 | Glenn et al. |
| 2008/0034831 A1 | 2/2008 | Glenn |
| 2008/0066518 A1 | 3/2008 | Glenn et al. |
| 2008/0250603 A1 | 10/2008 | Skinner et al. |
| 2009/0178262 A1 | 7/2009 | Reid et al. |
| 2009/0304315 A1 | 12/2009 | Johnson |
| 2010/0000280 A1 | 1/2010 | Reid et al. |
| 2010/0260572 A1 | 10/2010 | Wehrmeister et al. |
| 2011/0182689 A1 | 7/2011 | Avetisian |

FOREIGN PATENT DOCUMENTS

| | | |
|---|---|---|
| DE | 3545554 A1 | 7/1987 |
| DE | 8901317 U1 | 3/1989 |
| EP | 0054592 A1 | 6/1982 |
| EP | 0140516 A1 | 5/1985 |
| EP | 0248122 A2 | 12/1987 |
| EP | 0785366 A1 | 7/1997 |
| EP | 0891007 A1 | 1/1999 |
| EP | 0945919 B1 | 9/1999 |
| EP | 1166951 A1 | 1/2002 |
| EP | 1202458 A1 | 5/2002 |
| EP | 1525952 A1 | 4/2005 |
| EP | 1611976 A1 | 1/2006 |
| EP | 1624202 A2 | 2/2006 |
| EP | 1872895 A2 | 1/2008 |
| EP | 1903221 A2 | 3/2008 |
| FR | 2645052 | 10/1990 |
| GB | 593607 | 10/1947 |
| GB | 1395009 | 5/1975 |
| GB | 2239917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 10-274366 | 10/1998 |
| JP | 10-299735 | 11/1998 |
| JP | 2001-177964 | 6/2001 |
| JP | 2004-176254 | 6/2004 |
| SU | 632463 | 11/1978 |
| WO | 84/00120 A1 | 1/1984 |
| WO | 8701418 A1 | 3/1987 |
| WO | 91/11273 A1 | 8/1991 |
| WO | 00/28221 A2 | 5/2000 |
| WO | 02/059489 A1 | 8/2002 |
| WO | 2006/132936 A1 | 12/2006 |
| WO | 2007/082077 A1 | 7/2007 |
| WO | 2007/121932 A1 | 11/2007 |
| WO | 2010/009442 A2 | 1/2010 |

\* cited by examiner

INSTALLABLE ASSEMBLY HAVING AN EXPANDABLE OUTER MEMBER AND A FASTENER WITH A MANDREL

CROSS-REFERENCE TO RELATED APPLICATION

This application claims the benefit under 35 U.S.C. §119 (e) of U.S. Provisional Patent Application No. 61/168,544 filed Apr. 10, 2009. This provisional application is incorporated herein by reference in its entirety.

BACKGROUND

1. Technical Field

This disclosure generally relates to assemblies for installation in a workpiece. The assemblies include expandable outer members and fasteners.

2. Description of the Related Art

Fastener assemblies are often used to interconnect a plurality of workpieces, such as a stack of plates or other structural members. Some conventional fastener assemblies have a bolt and a collar that cooperate to apply a clamp-up force to a multi-component workpiece (e.g., overlapping panels). To form a joint, a hole is drilled through the multi-component workpiece. A bolt is then inserted through the hole such that an end of the bolt protrudes outwardly from the workpiece. The workpiece is clamped between a head of the bolt and the collar. Unfortunately, these types of joints are susceptible to fatigue damage and have undesired electrical properties. Contaminates (e.g., moisture, chemicals, debris, and other foreign substances) can become lodged between faying surfaces of joints and between the workpiece and bolt resulting in impaired electrical performance, increased wear, and increased corrosion. Cyclic loading can lead to fatigue problems. Conventional fastener assemblies may allow workpiece components to move relative to one another, which may result in fretting, excessive stresses at the interfaces of the hole and the bolt, vibrations, and the like. In aerospace applications, conventional joints may thus have a relatively short in-service life. Additionally, conventional fastener assemblies may be prone to electrical arcing or spark formation if the electrical current flows through the fastener assembly, for example, due to a lightning strike.

Aircraft are often made of lightweight composite structures that are unable to withstand electrical currents as well as their metallic counterparts. Composite structures may be damaged by high voltage electrical currents caused by lightning strikes because composite structures do not readily conduct away the electrical currents and electromagnetic forces generated by lightning strikes. Many composite structures may have relatively poor electrical conductivity. Hence, electrical current will bypass such and pass through highly conductive materials, such as metals, if given the opportunity. Conventional metal bolt/sleeve assemblies often have gaps that lead to electrical arcing and sparks. Additionally, conventional bolt/sleeve assemblies have a tendency to cause damage in composite laminates when tolerances stack up to make relatively high interferences. Furthermore, an installed bolt typically cannot be removed without damaging the workpiece because of the high interferences. It may therefore be difficult to perform inspections or routine maintenance on joints with these types of bolt/sleeve assemblies.

BRIEF SUMMARY

At least some embodiments disclosed herein involve installing an expandable outer member within an opening in a workpiece and pulling a fastener into the outer member in a single operation. The outer member serves as a protective liner and is controllably expanded to minimize, limit, or substantially eliminate damage to the workpiece. The outer member enhances performance and provides the ability to remove the fastener with no appreciable damage to the workpiece. The outer member, in some embodiments, remains secured to the workpiece as the fastener is pulled out of the outer member. The assembly can provide increased lightning strike protection by eliminating electrical arcing, eliminating spark formation, improving fatigue performance, and/or improving grounding of the structure. The assembly can also provide enhanced fatigue performance of the structure. In certain embodiments, the assembly can be installed in, or proximate to, a fuel tank, such as an aircraft fuel tank, due to its lightning strike protection capabilities and resistance to electrical arcing or sparking.

In some embodiments, an assembly installable in an opening of a workpiece comprises an outer member and a fastener. The outer member has a passageway. The fastener is movable through the passageway and includes a mandrel dimensioned to radially expand the outer member and a stem including an expansion portion and a propping portion, and a separable portion between the mandrel and the stem. The expansion portion is configured to radially expand the outer member after at least a portion of the outer member has been expanded by the mandrel. The separable portion can generally include a frangible portion that fractures upon application of a sufficient axial load, a coupler that couples together the stem and the mandrel, and/or a detachable interface between the stem and the mandrel. In some embodiments, the coupler is a breakaway component with an integrated frangible portion or other type of feature.

In other embodiments, a fastener comprises a mandrel and a stem. The mandrel includes an expansion section configured to radially expand an expandable outer member into a workpiece, a contraction section, and a major cylindrical section between the expansion section and the contraction section. Both the expansion section and the contraction section taper away from the major cylindrical section. The stem includes an enlarged head, a stem expansion section configured to radially expand the outer member after the outer member has been expanded by the mandrel, and a propping portion between the enlarged head and the expansion section. The propping portion is dimensioned to keep the outer member in an expanded configuration. The fastener can be pulled or pushed into an opening, such as an opening of a workpiece, an outer member (one piece or multi-piece outer members), a fastener, a bushing, a liner, or the like.

In some other embodiments, a method of installing an assembly comprises positioning an expandable outer member within an opening of a workpiece. At least a portion of the outer member is expanded to an over-expanded configuration by moving a mandrel of a fastener along a passageway of the outer member so as to form an interference fit between the outer member and the workpiece. A contraction section of the mandrel is moved along the passageway of the outer member to allow an expanded portion of the outer member to radially contract. A contracted portion of the outer member is expanded by moving a stem of the fastener along the passageway of the outer member.

In yet other embodiments, a method comprises radially expanding a hollow tubular member using a mandrel of a fastener to produce an interference fit between the hollow tubular member and a workpiece. The expanded hollow tubular member is allowed to radially contract or relax. The contracted or relaxed hollow tubular member is then radially expanded using a stem of the fastener. The mandrel is separated from the stem after the stem is positioned in the hollow tubular member.

In certain embodiments, a fastener has a one-piece construction with a stem integrated into a mandrel. In other embodiments, the fastener is a multi-component structure. The stem can be separable from the mandrel without damaging the stem and/or the mandrel. Threaded couplers, fasteners, pins or other components can be used to couple the fastener's components together. The mandrel can be reused any number of times to install any number of stems or can be discarded.

In some embodiments, a fastener includes a separable portion that is incorporated into a stem, a mandrel, or both. In some embodiments, the separable portion includes a coupler that is integrally formed with the stem or the mandrel. A narrowed portion of the coupler can be positioned between the stem and the mandrel.

In yet other embodiments, a coupler includes a first portion that is received by a stem and a second portion that is received by a mandrel. A narrowed region is between the first and second portions. The narrowed region can break apart to allow separation of the stem and mandrel.

In some other embodiments, a coupler is an externally threaded rod that is received and coupled to both a stem and a mandrel. A threaded rod can be reused any number of times to apply axial loads to the stem (e.g., to pull the stem into a hollow body or opening). If the threads of the coupler become damaged, it can be replaced with another coupler.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION

In the following description, certain specific details are set forth in order to provide a thorough understanding of various aspects of representative embodiments. One skilled in the art, however, will understand that the embodiments may be practiced without these details. The assemblies, installation apparatuses, and processes disclosed herein can be used to couple together workpieces and, in some embodiments, may improve in-service performance of these workpieces, such as electrical performance, mechanical performance, fatigue performance, lightning strike performance, or the like. The assemblies can be installed at a wide range of locations. The phrase "expandable assembly" refers to an assembly both in a pre-expanded state and an expanded state, unless the context dictates otherwise.

Unless the context requires otherwise, throughout the specification and claims which follow, the word "comprise" and variations thereof, such as, "comprises" and "comprising" are to be construed in an open, inclusive sense, that is as "including, but not limited to."

The terms "proximal" and "distal" are used to describe the illustrated embodiments and are used consistently with a description of non-limiting exemplary applications. The terms "proximal" and "distal" are used in reference to the user's body when the user operates an installation apparatus to install assemblies, unless the context clearly indicates otherwise. It will be appreciated, however, that the illustrated embodiments can be located or oriented in a variety of desired positions.

As used in this specification and the claims, the singular forms "a," "an," and "the" include plural referents unless the content clearly dictates otherwise. It should also be noted that the term "or" is generally employed in its sense including "and/or" unless the context clearly dictates otherwise.

Figure 1:
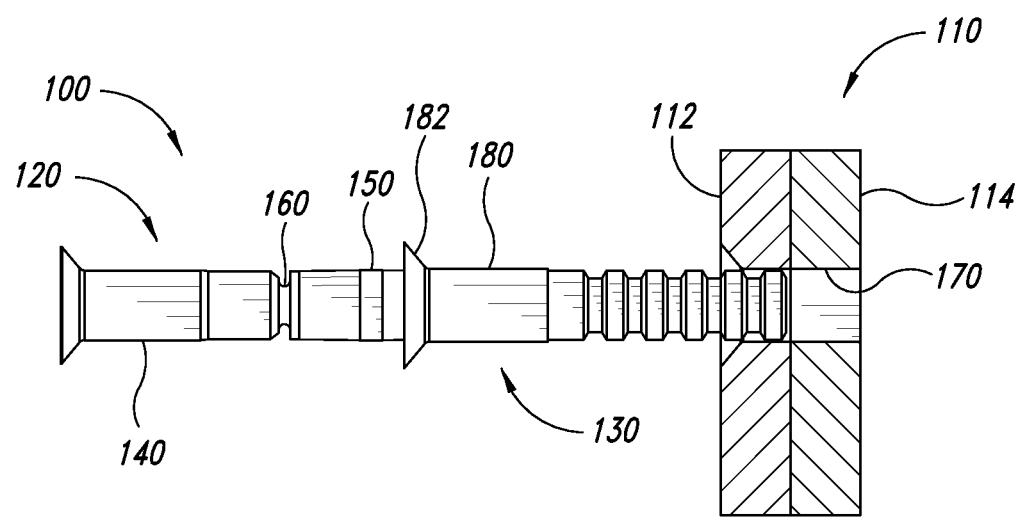
FIG. 1 is an elevational view of an expandable assembly ready to be installed in a multi-component workpiece. The multi-component workpiece is shown in cross-section.

FIG. 1 shows an assembly 100 ready to be installed in a multi-component workpiece 110. The assembly 100 can be installed in a single drive operation to reduce installation time and complexity. Interferences can be controlled based on the properties of the workpiece 110 to optimize in-service performance. The workpiece 110 includes a first structural member 112 and a second structural member 114 that form a joint. The assembly 100 includes a fastener 120 and an expandable outer member 130 surrounding the fastener 120. The illustrated outer member 130 is in an unexpanded initial configuration. The fastener 120 includes a stem 140, a mandrel 150, and a separable portion 160 between the stem 140 and the mandrel 150.

Figure 2:
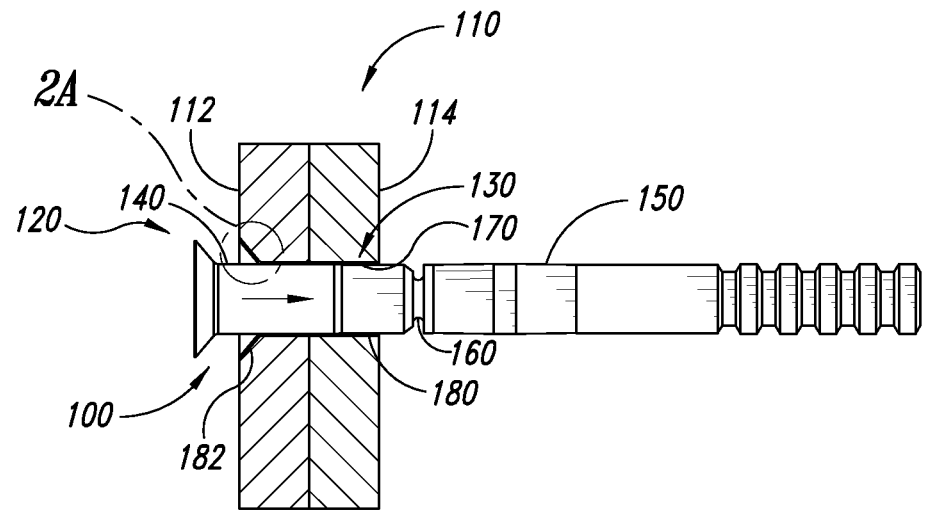
FIG. 2 is an elevational view of the expandable assembly positioned in an opening of the multi-component workpiece of FIG. 1, according to one illustrated embodiment.
Figure 2A:
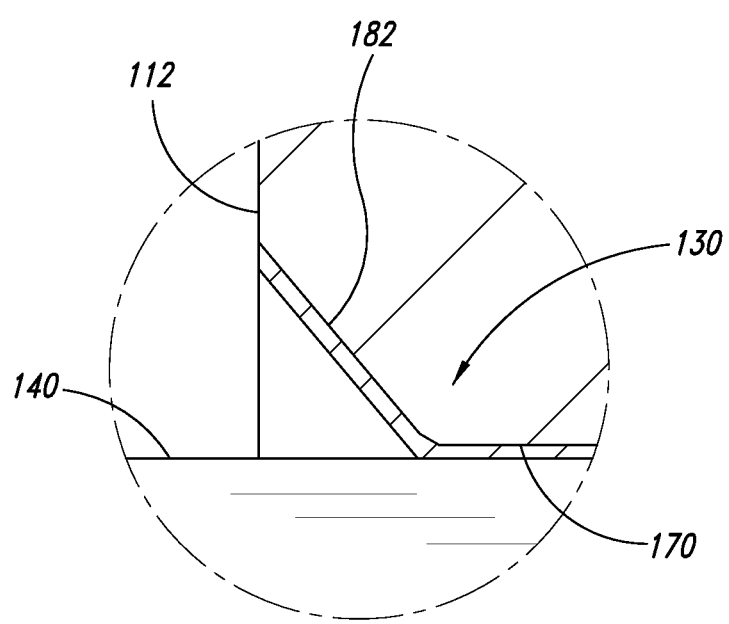
FIG. 2A is a detailed view of a portion of the expandable assembly and workpiece of FIG. 2.
Figure 3:
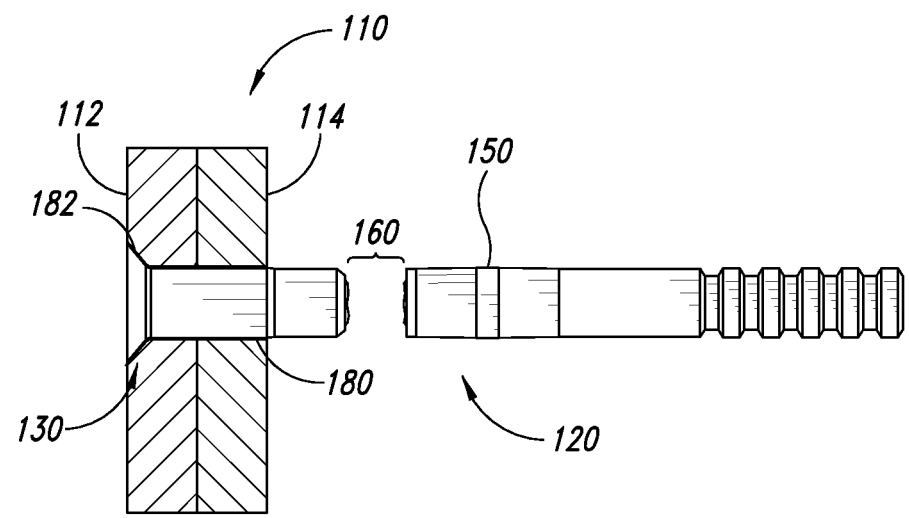
FIG. 3 is an elevational view of the assembly installed in the workpiece after a fastener has been broken apart.

FIGS. 2 and 2A show the outer member 130 (shown in cross-section) positioned in an opening 170 of the workpiece 110. The stem 140 is being moved through the outer member 130. The mandrel 150 has been moved through the outer member 130 to expand the outer member 130 from the unexpanded configuration to an over-expanded configuration. The over-expanded outer member 130 contracts to an intermediate expanded configuration as the separable portion 160 moves through the outer member 130. The stem 140 radially expands the outer member 130 from the intermediate expanded configuration to an installed expanded configuration. The mandrel 150 is then separated from the stem 140 and discarded or reused. In this manner, the fastener 120 installs the outer member 130 and is part of the installed assembly 100. FIG. 3 shows the fastener 120 after the separable portion 160 has been separated. The illustrated separable portion 160 is a frangible portion that breaks apart.

The outer member 130 can be a grommet. For instance, the outer member 130 can be one of the grommets disclosed in U.S. Pat. Nos. 5,083,363; 5,096,349; and 5,245,743. Each of these three patents is incorporated by reference in its entirety. The outer member 130, in some embodiments, has a tubular main body 180 and an enlarged head 182 connected to the main body 180. The enlarged head 182 flares outwardly to mate with a countersink in the workpiece 110. The outer member 130 can be a tubular grommet with or without a head, a sleeve, T-shaped flange, a flush head grommet, or the like. The outer member 130 can have a nominal wall thickness that is equal to or greater than about 0.1 inches, 0.05 inches, or 0.02 inches. In some embodiments, the wall thickness of the outer member 130 is about 0.01 inch. The outer member 130 can also, for example, be a bushing, a bushing assembly (e.g., multiple bushings that can be assembled together), a fitting, or other type of installable component. Various types of expansion processes can be employed to expand the outer members. In a cold expansion process, the outer member 130 can be radially expanded without appreciably raising the temperature of the outer member 130 to produce residual stresses in the workpiece 110 to enhance fatigue performance. The residual stresses are preferably compressive stresses that can minimize, limit, inhibit, or prevent crack initiation and/or crack propagation.

As used herein, the term "workpiece" is broadly construed to include, without limitation, a one-piece or multi-piece parent structure having at least one opening suitable for receiving at least one component of the assembly 100. The opening 170 can be a through-hole (with or without back side access), a blind hole, or other type of hole. In some embodiments, the assembly 100 is installed in a structural workpiece, such as a bulkhead, a fuselage, a fuel tank, an engine, or other structural member of an aircraft. If the workpiece 110 is a multi-piece structure, the assembly 100 can hold the pieces of the workpiece together with a desired clamp-up force.

Figure 4:
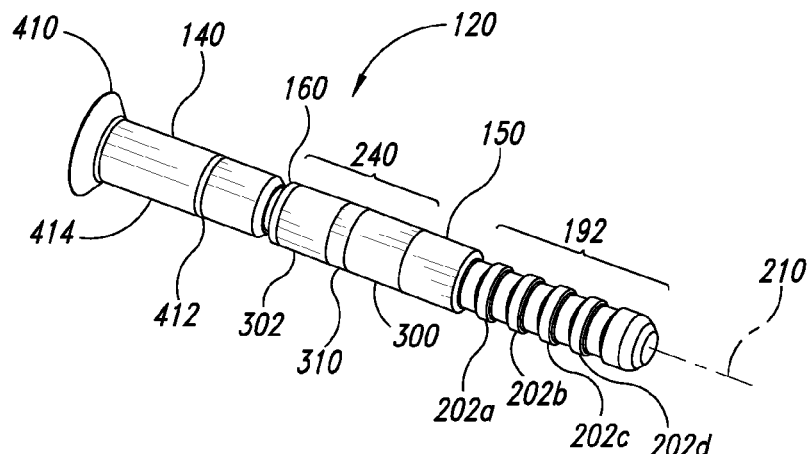
FIG. 4 is an isometric view of a fastener, according to one illustrated embodiment.
Figure 5:
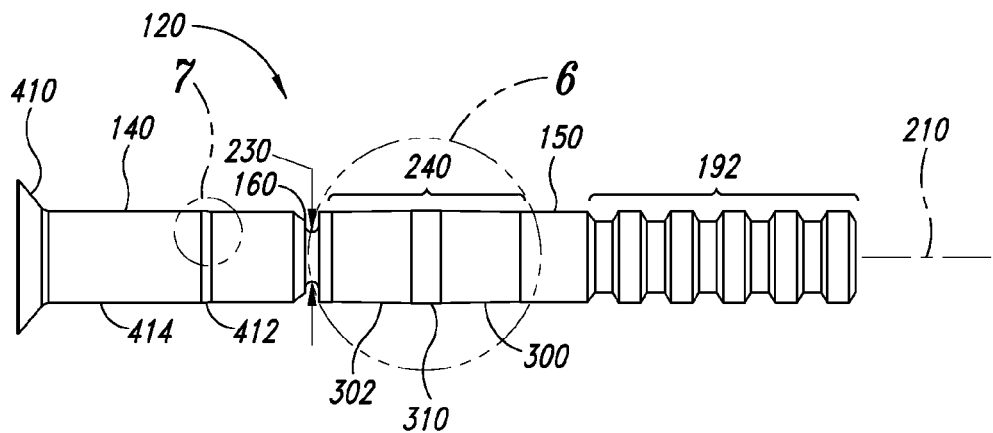
FIG. 5 is an elevational view of the fastener of FIG. 4.

FIGS. 4 and 5 show the fastener 120 prior to installation. The mandrel 150 is a separable component integrally formed with the stem 140. The mandrel 150 may include an expansion head 240 and an engagement region 192 for releasably coupling to an installation apparatus. The engagement region 192 includes a plurality of engagement features 202a, 202b, 202c, 202d (collectively 202). In some embodiments, including the illustrated embodiment of FIG. 4, the engagement features 202 are circumferential grooves spaced apart from each other with respect to a longitudinal axis 210 of the fastener 120. The engagement features 202 can be other types of coupling features for temporarily or permanently coupling to installation apparatuses.

A narrowed region of the separable portion 160 has a cross-sectional area taken at 230 (FIG. 5) that is less than the cross-sectional areas of the other sections of the fastener 120. The cross-sectional area at 230 can thus be the minimum cross-sectional area of the fastener 120 and may serve as a crack initiation site. Cracks can propagate generally along a plane that is substantially perpendicular to the longitudinal axis 210.

The separable portion 160 can include an edge notch that serves as a crack initiation site. Exemplary edge notches include, without limitation, a circumferential groove having a generally U-shaped cross-section, V-shaped cross-section, or the like. Other types of edge notches or parting features can be used to control stress concentrations, crack initiation, and/or crack propagation such that the mandrel 150 is separable from the stem 140 without appreciably damaging to any significant extent other features of the assembly 100.

The expansion head 240 can gradually radially expand the outer member 130, prop open the outer member 130, and gradually disengage the outer member 130 to inhibit, limit, or substantially prevent problems associated with rapid mandrel disengagement. The expansion head 240 of FIGS. 4-6 includes an expansion section 300, a contraction section 302, and a central section 310. The central section 310 can be a major diameter section or a major cylindrical section (illustrated) located between the expansion and contraction sections 300, 302.

Figure 6:
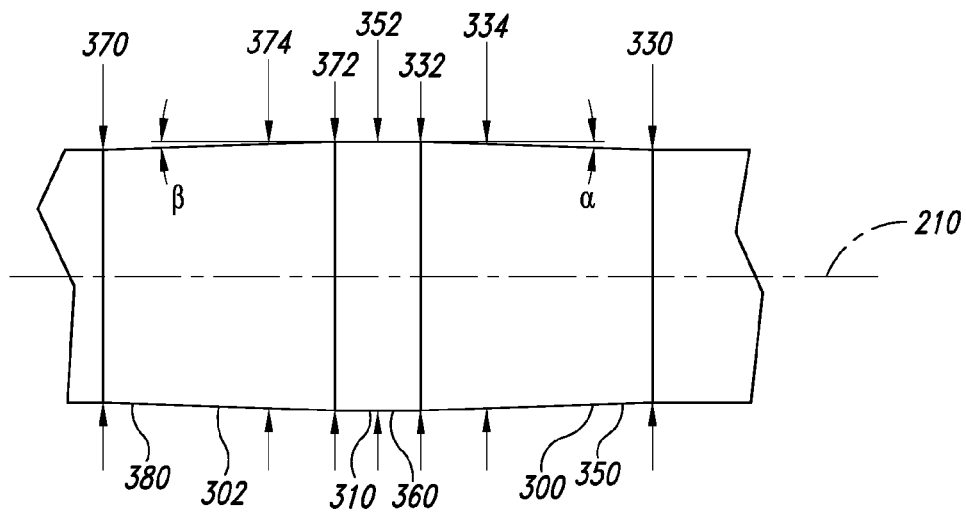
FIG. 6 is a detailed elevational view of a mandrel of the fastener of FIG. 4.

FIG. 6 depicts the expansion and contraction sections 300, 302 defining corresponding angles of taper $\alpha$, $\beta$ with respect to a reference axis (e.g., the longitudinal axis 210 of the fastener 120). The expansion section 300 can converge towards the longitudinal axis 210 and taper away from the central section 310 so as to define the angle of taper $\alpha$. The contraction section 302 can converge towards the longitudinal axis 210 and taper away from the central section 310 towards the separable section 160 so as to define the angle of taper $\beta$. The angles of taper $\alpha$, $\beta$ can be generally uniform along the expansion section 300 and the contraction section 302, respectively. In other embodiments, the angles of taper $\alpha$, $\beta$ can be average angles of taper taken along the lengths of the expansion section 300 and the contraction section 302, respectively.

The expansion section 300 includes a minimum outer dimension 330, a maximum outer dimension 332, and a transition outer dimension 334 extending therebetween. As used herein, the term "outer dimension" can include, but is not limited to, a circumference, a perimeter, a diameter, or other measurable lengths, widths, or areas. The maximum outer dimension 332 is at least slightly larger than the minimum outer dimension 330 so as to define a sloped expansion surface 350. The expansion surface 350 can be a generally frusto-conical surface.

The central section 310 may be used to ensure that the outer member 130 has been fully expanded. A generally tubular or cylindrical outer surface 360 extends between the expansion and contraction sections 300, 302. In some embodiments, the central section 310 can have a varying outer dimension 352 to produce, for example, various types of surface finishes. In other embodiments, the outer dimension 352 is generally constant along the length of the central section 310.

With continued reference to FIG. 6, the contraction section 302 includes a minimum outer dimension 370, a maximum outer dimension 372, and a transition outer dimension 374 extending therebetween. The maximum outer dimension 372 can be generally equal to the outer dimension 352 of the central section 310. The contraction section 302 further includes a generally frusto-conical outer surface 380.

The angles of taper $\alpha$, $\beta$ can be selected based on the desired amount of expansion, rate of expansion/contraction, or the maximum stresses/strains in the expandable outer member 130 and/or workpiece 110. In some embodiments, one or both angles of taper $\alpha$, $\beta$ are equal to or less than about 12°, 10°, 8°, 5°, 3°, 2°, 1°, or ranges encompassing such angles. In some embodiments, for example, the angles of taper $\alpha$, $\beta$ are less than about 5°. Such embodiments are especially well suited for controlled expansion and contraction without producing a significant amount of longitudinally displaced material of the outer member 130 or the workpiece 110. If the workpiece 110 is made of a fiber reinforcement composite material, the outer member 130 can thus be radially expanded without causing appreciable delamination, micro-cracking, stress concentrations, or the like. In some embodiments, the angles of taper $\alpha$, $\beta$ are generally equal to each other and less than about 3°. A ratio between the angles of taper $\alpha$, $\beta$ can be selected such that the mandrel 150 consistently produces reliable installations. For example, the ratio between the angles of taper $\alpha$, $\beta$ can be in a range of about 0.5 to about 2.0, a range of about 0.7 to about 1.3, or a range of about 0.9 to about 1.1. In some embodiments, the ratio between the angles of taper $\alpha$, $\beta$ is about 1.

Figure 7:
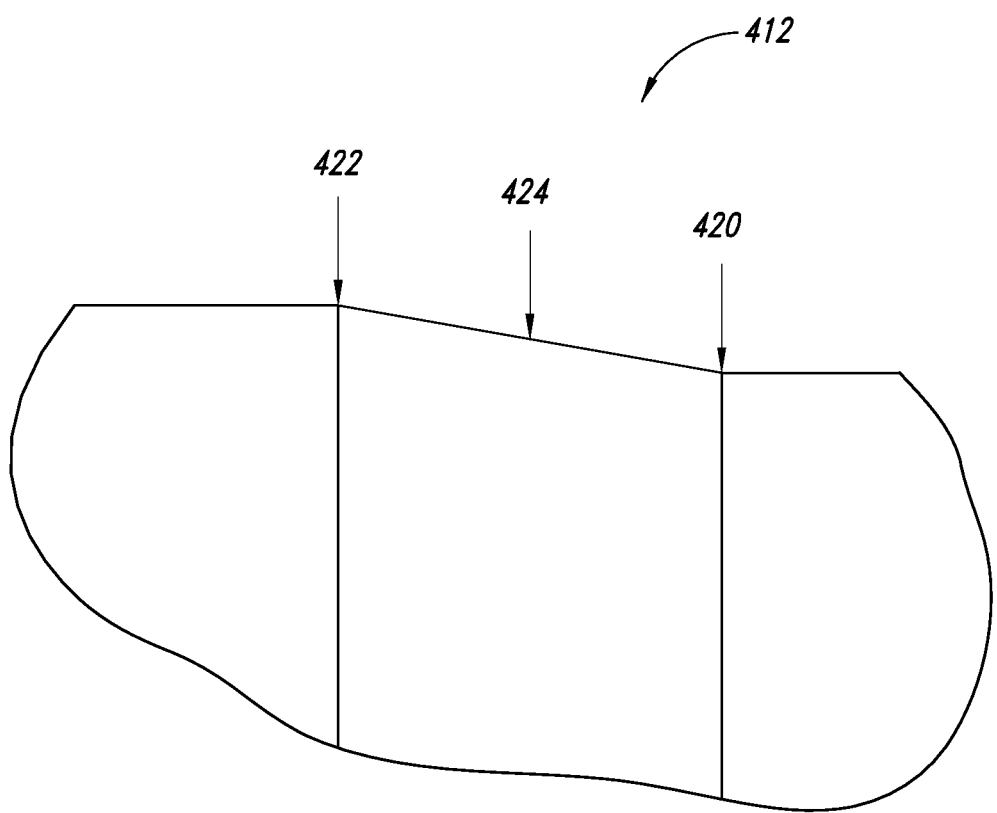
FIG. 7 is a detailed view of an expansion portion of a stem of the fastener of FIG. 4.

Referring again to FIGS. 4 and 5, the stem 140 includes an enlarged head 410, a tapered expansion portion 412, and a propping portion 414 between the head 410 and the expansion portion 412. The head 410 is shaped to mate with the head 182 of the outer member 130. FIG. 7 shows the expansion portion 412 with a minimum outer dimension 420, a maximum outer dimension 422, and a transition outer dimension 424 extending therebetween. The minimum outer dimension 420 can be smaller than the outer dimension 352 of the central section 310. The maximum outer dimension 422 can be larger than the inner dimension of the outer member 130 in the intermediate expanded configuration. As such, the outer member 130, in the intermediate expanded configuration, can be re-expanded by the expansion portion 412.

Figure 8:
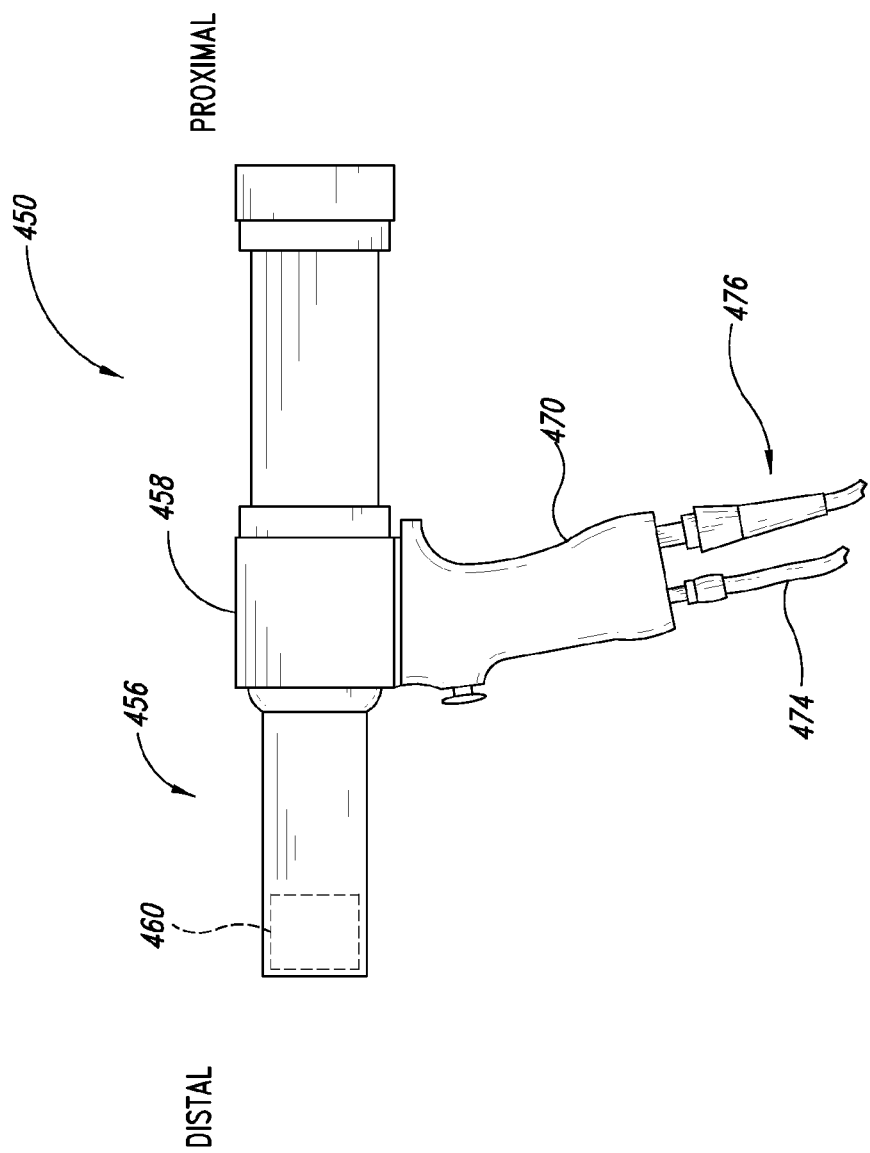
FIG. 8 is an elevational view of an installation apparatus for installing an expandable assembly, in accordance with one embodiment.

FIG. 8 shows an installation apparatus 450 that includes an installation tool 456 for installing assemblies. Generally, the installation tool 456 includes an actuator unit 458 (illustrated as a puller unit) and a swaging assembly 460 (shown in dashed line) carried by the puller unit 458. The puller unit 458 includes a grip 470. A user can manually grasp the grip 470 for comfortably holding and accurately positioning the installation tool 456. The illustrated grip 470 is a pistol grip. However, other types of grips can also be utilized.

The installation tool 456 can be driven electrically, hydraulically, pneumatically, or by any other suitable drive system. In some embodiments, the puller unit 458 houses a drive system capable of driving a component of the fastener assembly, preferably along a predetermined path (e.g., a line of action), in a proximal direction and/or distal direction. A pair of fluid lines 474, 476 may provide pressurized fluid (e.g., pressurized gas, liquid, or a combination thereof) to a piston drive system that operates the swaging assembly 460.

Figure 9:
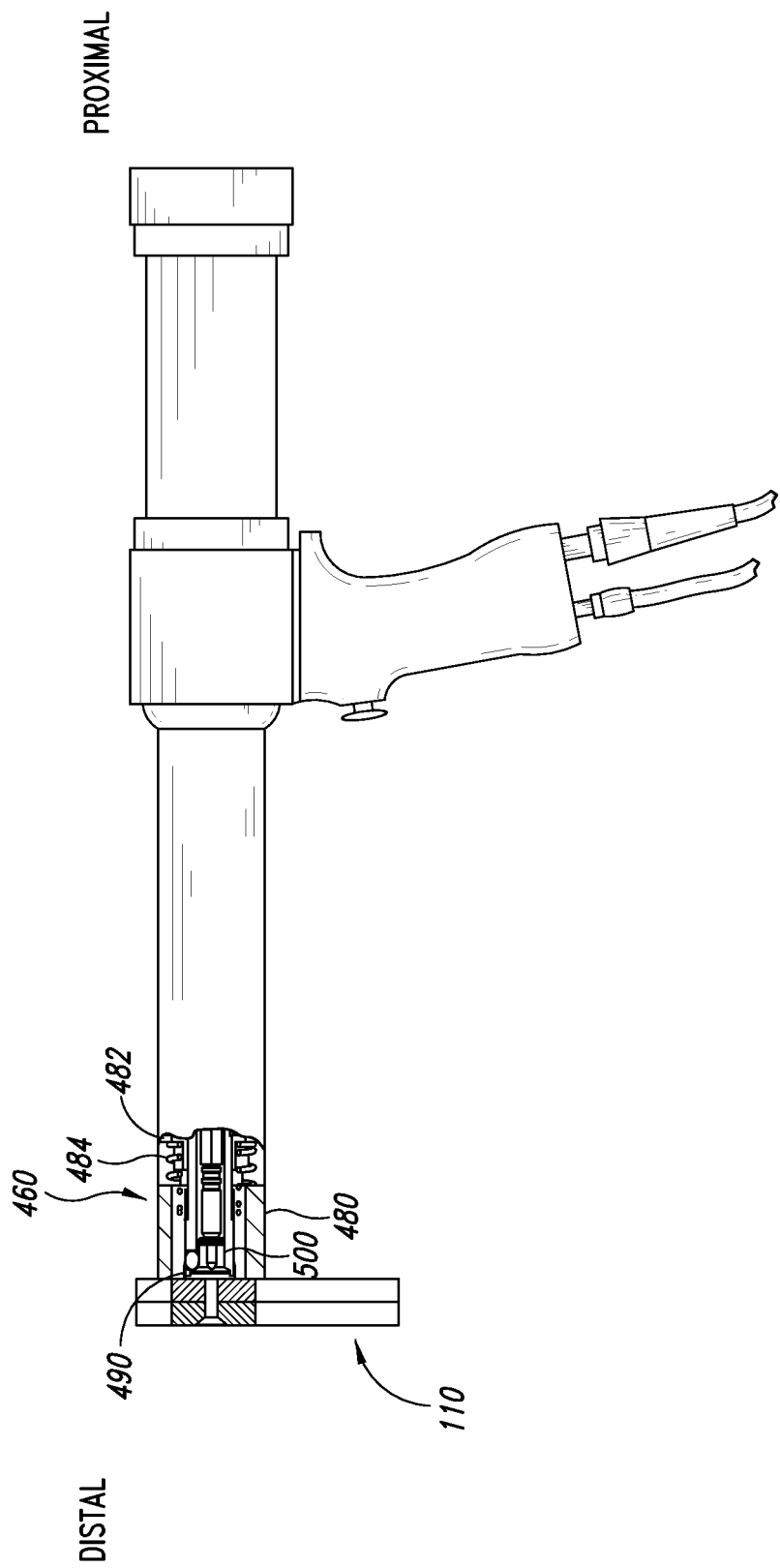
FIG. 9 is an elevational view of the installation apparatus installing an expandable assembly in a workpiece. A puller unit of the installation apparatus is shown partially cut-away.

Referring to FIG. 9, the swaging assembly 460 includes an outer housing 480, an actuating device 482, and a biasing member 484 between the outer housing 480 and the actuating device 482. The outer housing 480 is held against the workpiece 110 as the puller unit 458 pulls on the fastener 120 to install the assembly 100 in a single operation. The actuating device 482 is moved through the outer housing 480 towards the workpiece 110 to swage a collar 500. U.S. patent application Ser. No. 12/253,141, filed on Oct. 16, 2008, discloses installation systems, swaging components, and methods of installation that can be used to install the assembly 100. U.S. patent application Ser. No. 12/253,141 is incorporated herein by reference in its entirety.

FIGS. 10-17 illustrate one method of installing the assembly 100. Generally, the outer member 130 is positioned in the opening 170. The fastener 120 is inserted into the outer member 130. The collar 500 is moved over the fastener 120 and against the workpiece 110. The outer member 130 is over-expanded into the workpiece 110 using the mandrel 150. The over-expanded member 130 is allowed to contract to an intermediate expanded configuration. The outer member 130 is expanded again to an installed expanded configuration using the stem 140. The collar 500 is fixed to the fastener 120, and the mandrel 150 is removed. The stem 140 keeps the outer member 130 in the installed expanded configuration to maintain a desired interference fit.

Figure 10:
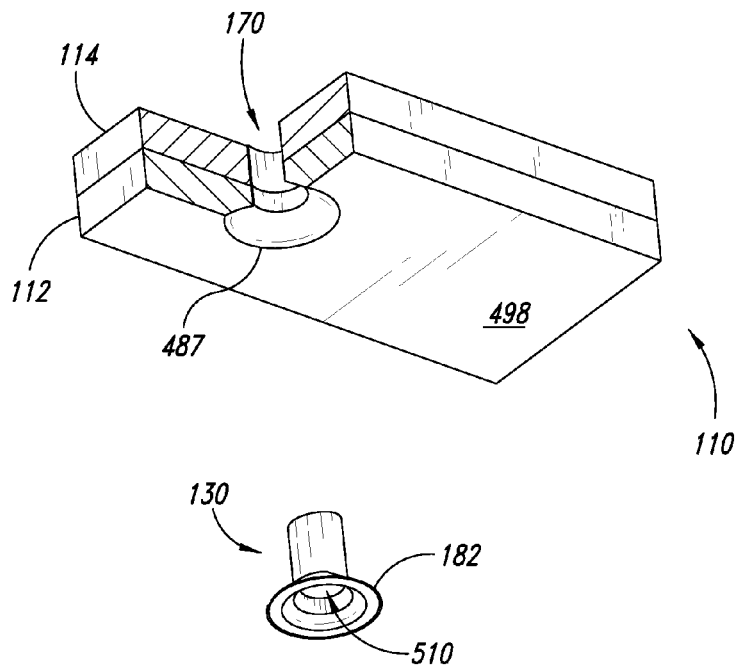
FIG. 10 is an isometric view of an expandable outer member ready for installation in an opening of a workpiece, in accordance with one illustrated embodiment. The workpiece is shown cut-away.

Referring to FIG. 10, the outer member 130, in a pre-expanded state, is inserted into the opening 170. A clearance fit, or other type of suitable fit, can be provided for convenient assembly. If the workpiece 110 is made of a composite material, a clearance fit can be provided to reduce, minimize, or substantially prevent damage to the workpiece 110 as the outer member 130 is placed within the opening 170. The opening 170 can closely receive the outer member 130 to reduce the amount of expansion required to install the outer member 130. In the illustrated embodiment, the outer member 130 is moved sequentially through the first and second panels 112, 114. When the head 182 is seated in a countersink 487, the edge of the head 182 can be generally flush with an outer surface 498 of the first panel 112.

Figure 11:
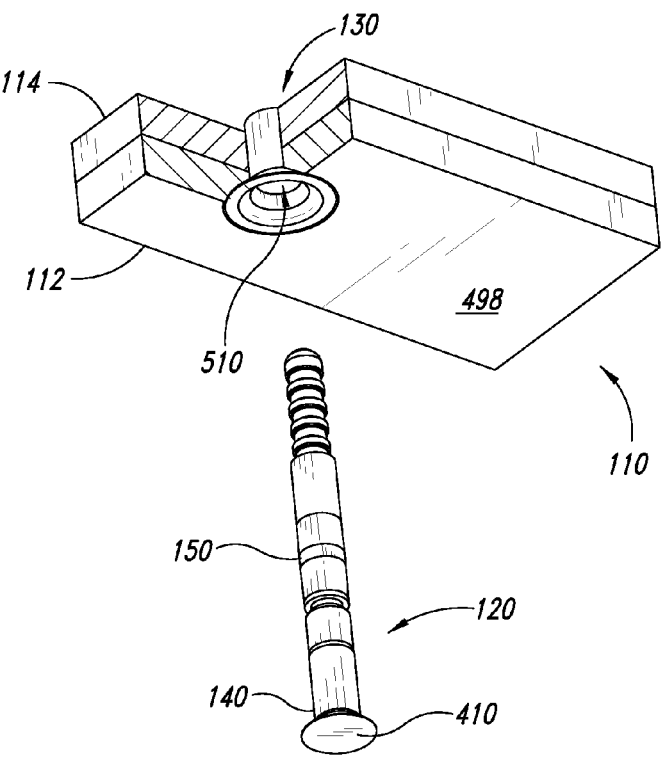
FIG. 11 is an isometric view of a fastener spaced apart from an expandable outer member in a hole of a workpiece. The workpiece is shown cut away.
Figure 12:
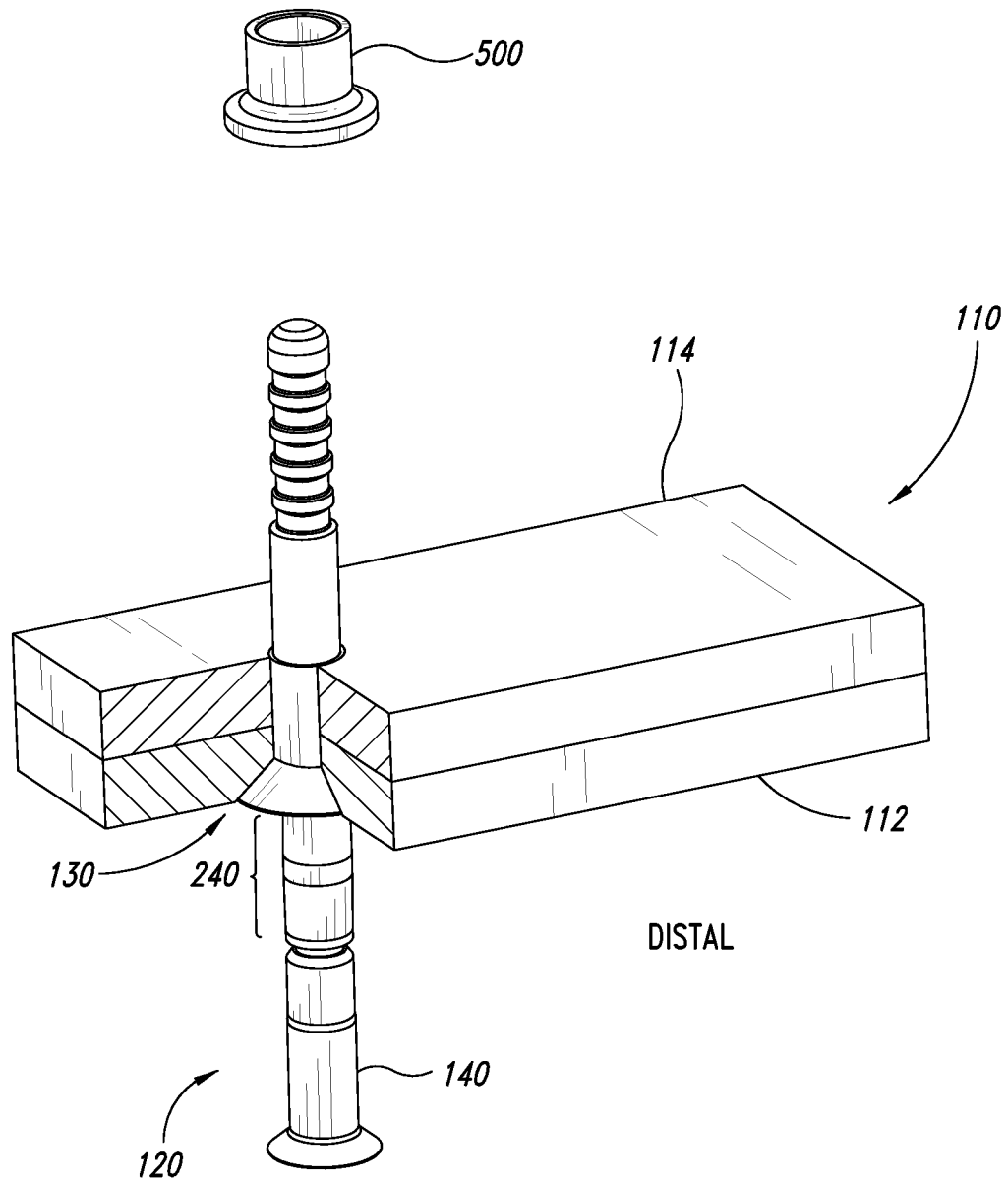
FIG. 12 is an isometric view of a deformable collar ready for placement over an expandable outer member assembled with a fastener. The workpiece is shown cut away.

FIG. 11 shows the outer member 130 ready to receive the fastener 120. The fastener 120 is inserted into and advanced through a passageway 510 of the outer member 130 until at least a portion of the fastener 120 protrudes outwardly from the member 130. As shown in FIG. 12, the collar 500 can be moved over the fastener 120 until the collar 500 rests against the workpiece 110. The expansion head 240 of the mandrel 150 is positioned on the distal side of the workpiece 110 and ready to be moved proximally through the outer member 130.

Figure 13:
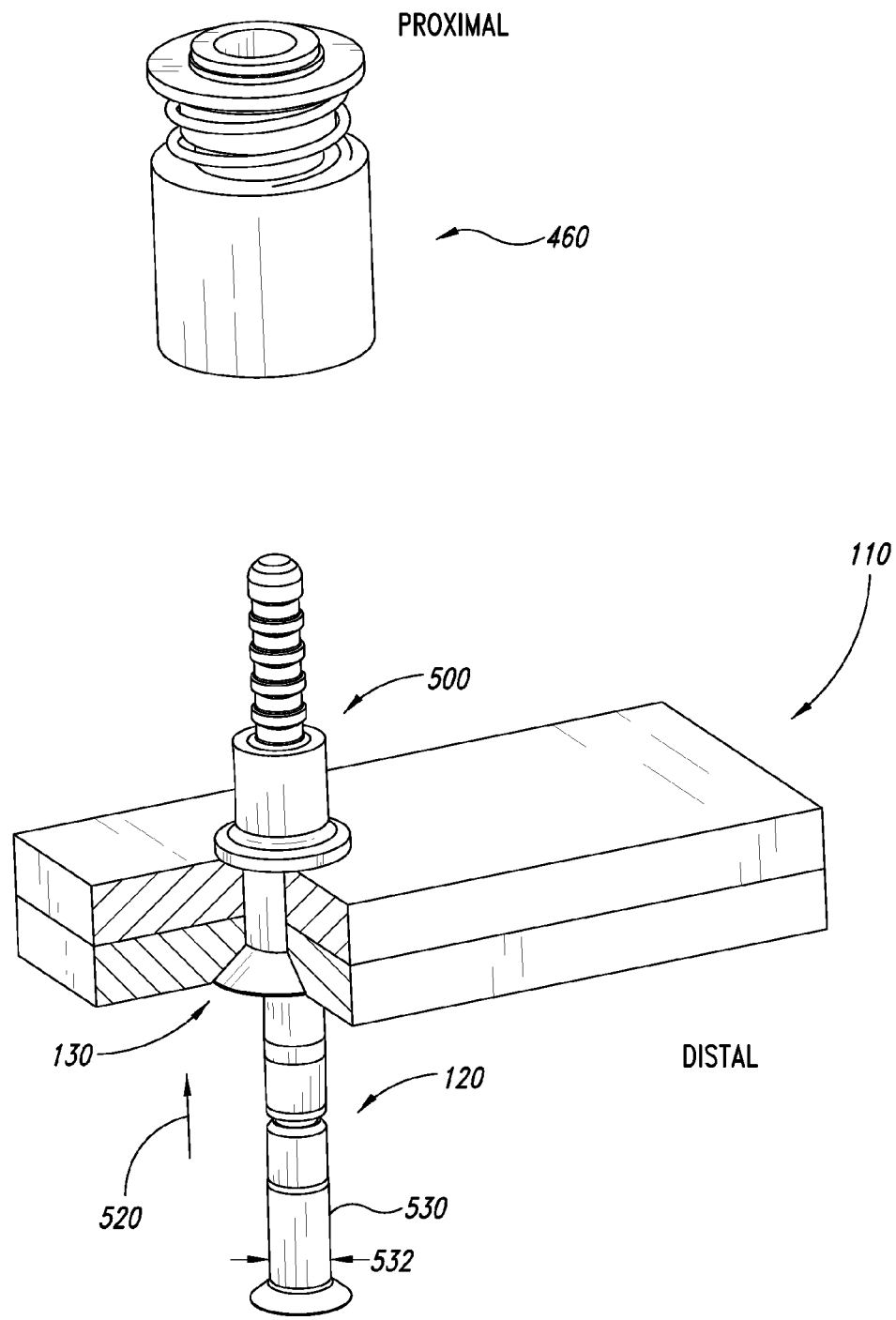
FIG. 13 is an isometric view of a swaging assembly ready for installing an installable assembly. The workpiece is shown cut away.

FIG. 13 shows the swaging assembly 460 ready to be coupled to the assembly 100. A puller unit (e.g., the puller unit 458 illustrated in FIG. 8) can be activated to pull the fastener 120 proximally through the outer member 130 (indicated by the arrow 520 of FIG. 13). As the mandrel 150 radially expands the outer member 130 from an initial configuration to an over-expanded configuration, a desired fit is produced with the workpiece 110. The outer member 130 can shield the inner surface of the opening 170 to prevent, limit, or substantially eliminate damage to the workpiece 110 and/or separation of the first and second members 112, 114. The wall thickness of the outer member 130 can be increased or decreased to increase or decrease shielding. Induced stresses can therefore be controlled throughout a portion, or the entire thickness, of the workpiece 110.

In some embodiments, a secure interference fit is maintained even as the radially expanded outer member 130 elastically springs back to the intermediate expanded state. The interference fit can prevent migration of the outer member 130 as the stem 140 is pulled into the member 130. The stem 140 has an outer perimeter 532 that is sized to be at least slightly larger than the inner perimeter of the outer member 130, in intermediate expanded configuration. The stem 140 re-expands and substantially prevents contraction of the outer member 130.

The opening 170 can be expanded without compromising the structural integrity of the workpiece 110, even at the free edges of the opening 170. Because the workpiece 110 is not exposed to any appreciable frictional forces during the expansion process, damage (e.g., delamination) of one or both of the members 112, 114 can be kept at or below a desired level, even in material proximate to the free edges. The minimal friction forces also prevent unwanted separation of the members 112, 114. The composition, dimensions, and configuration of the outer member 130 can be selected to minimize, limit, or substantially prevent undesired stresses (e.g., shear stresses) in the workpiece 110, to eliminate gaps, if any, in the installation, to produce desired stresses (e.g., compressive stresses in the workpeice 110), or the like.

Figure 14:
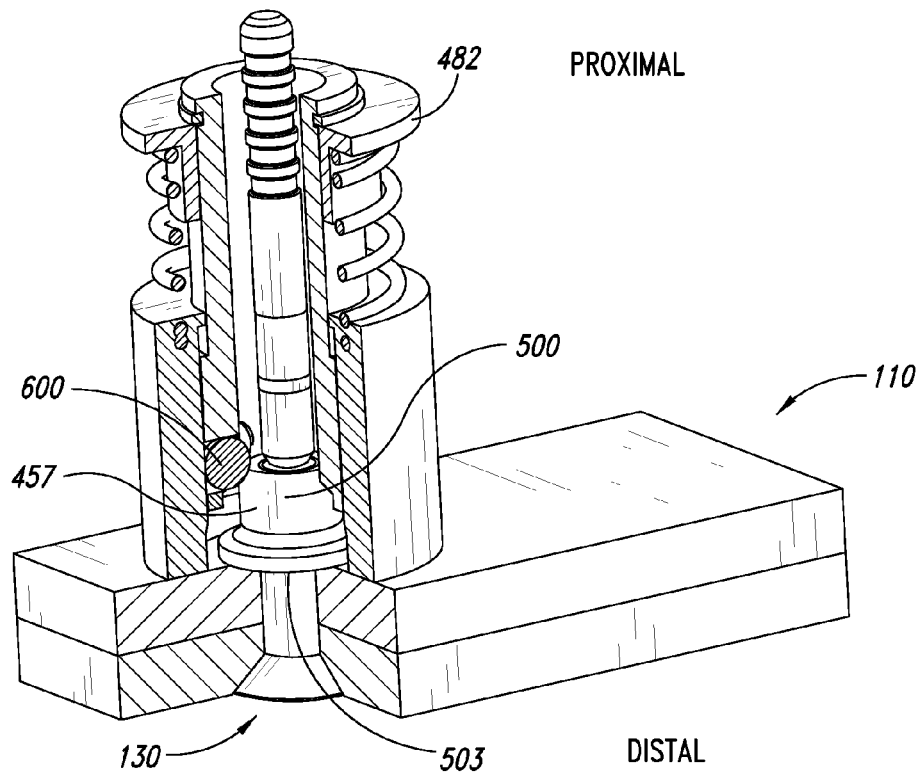
FIG. 14 is a cut-away view of a swaging assembly ready to deform a collar, according to one illustrated embodiment.

Referring to FIG. 14, the collar 500 is ready to be coupled to the fastener 120. An outer surface 457 of the collar 500 is a generally cylindrical surface. The actuating device 482 contacts and bears against the outer surface 457. The actuating device 482 is moved distally towards a flange 503 of the collar 500. A gripping mechanism of the puller unit pulls on the fastener 120 to keep the puller unit against the workpiece 110, while swaging elements 600 roll along the outer surface 457.

As the swaging elements 600 roll along the outer surface 457, the collar 500 is compressed against the fastener 120. The fastener 120 can have external threads or other engagement features that facilitate fixation of the collar 500. In some embodiments, the fastener 120 has external threads similar or identical to the threads discussed in connection with FIGS. 19-21. Each swaging element 600 can produce a longitudinally-extending swage groove. The grooves can have an arcuate cross-section, including a generally U-shaped cross-section, or other suitable cross-sections. As used herein, the term "groove" includes, but is not limited to, a generally long narrow furrow or channel. In some embodiments, the swaging elements 600 can push material of the collar 500 towards the workpiece 110 to increase the clamp-up forces. Each of the swaging elements 600 can cause a flow of material ahead of the interface between the swaging elements 600 and the collar 500. This flow of material can be pushed towards the flange 503 and results in significantly increased clamp-up forces.

Figure 15:
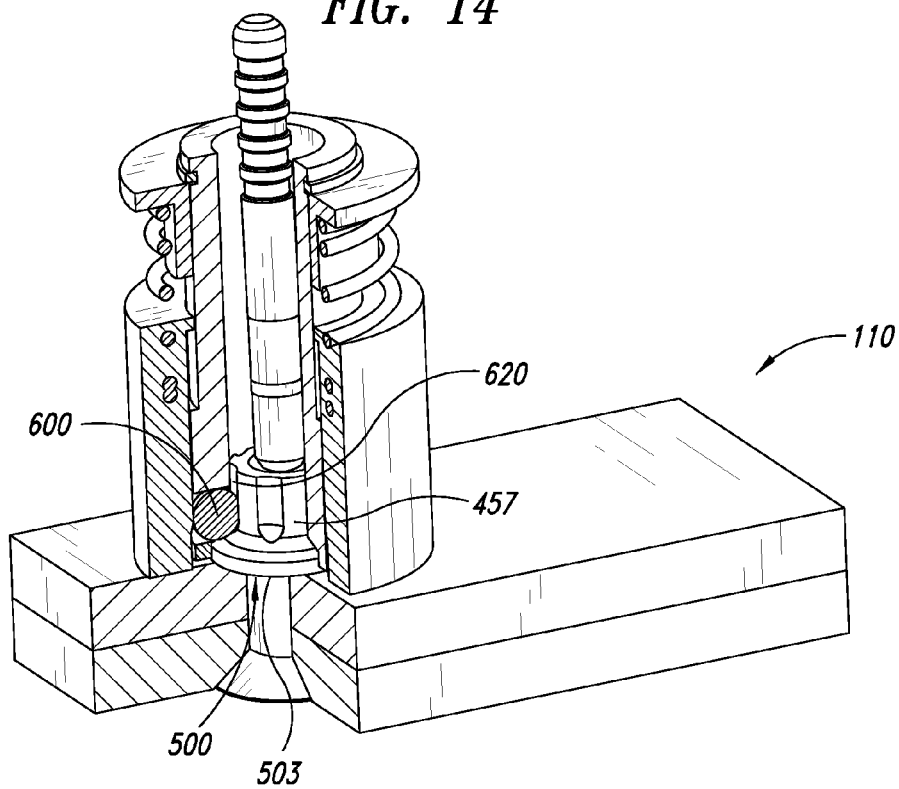
FIG. 15 is a cut-away view of the swaging assembly of FIG. 14 after deforming the collar.

FIG. 15 shows a plurality of grooves 620 circumferentially spaced from one another about the collar 500. The depths and widths of the grooves 620 can be increased by increasing the compressive forces applied by the swaging elements 600. The grooves 620 can extend along most of the longitudinal length of the collar 500 to lock a substantial portion of the longitudinal length of the collar 500 to the fastener 120.

Figure 16:
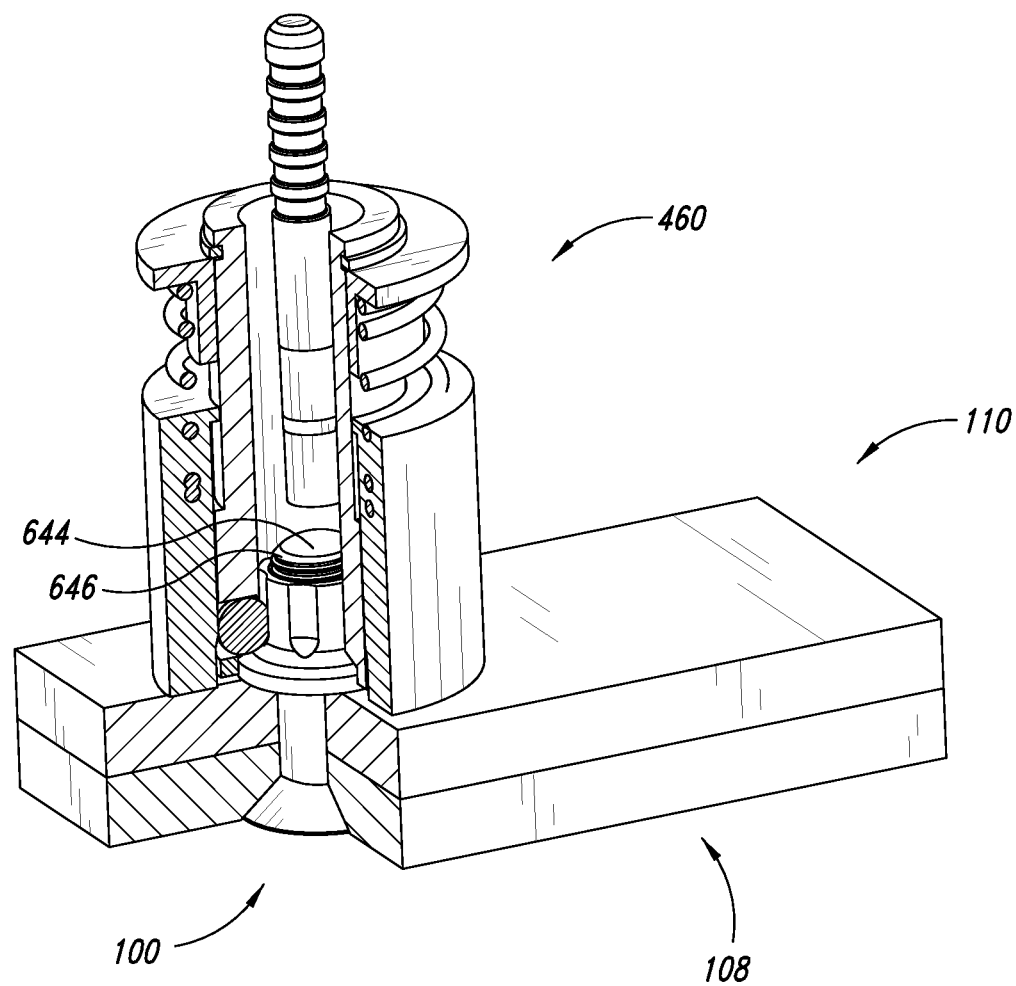
FIG. 16 is a cut-away view of the swaging assembly after breaking apart a fastener, according to one illustrated embodiment.

At full stroke, the swaging elements 600 are proximate the flange 503. After completing the swaging process, the puller unit can break off the mandrel 150. FIG. 16 shows the separable portion 160 after it is broken. External threads are shown on the stem 140 to facilitate coupling of the collar 500 to the stem 140. These threads are not shown in FIGS. 11-15.

Figure 17:
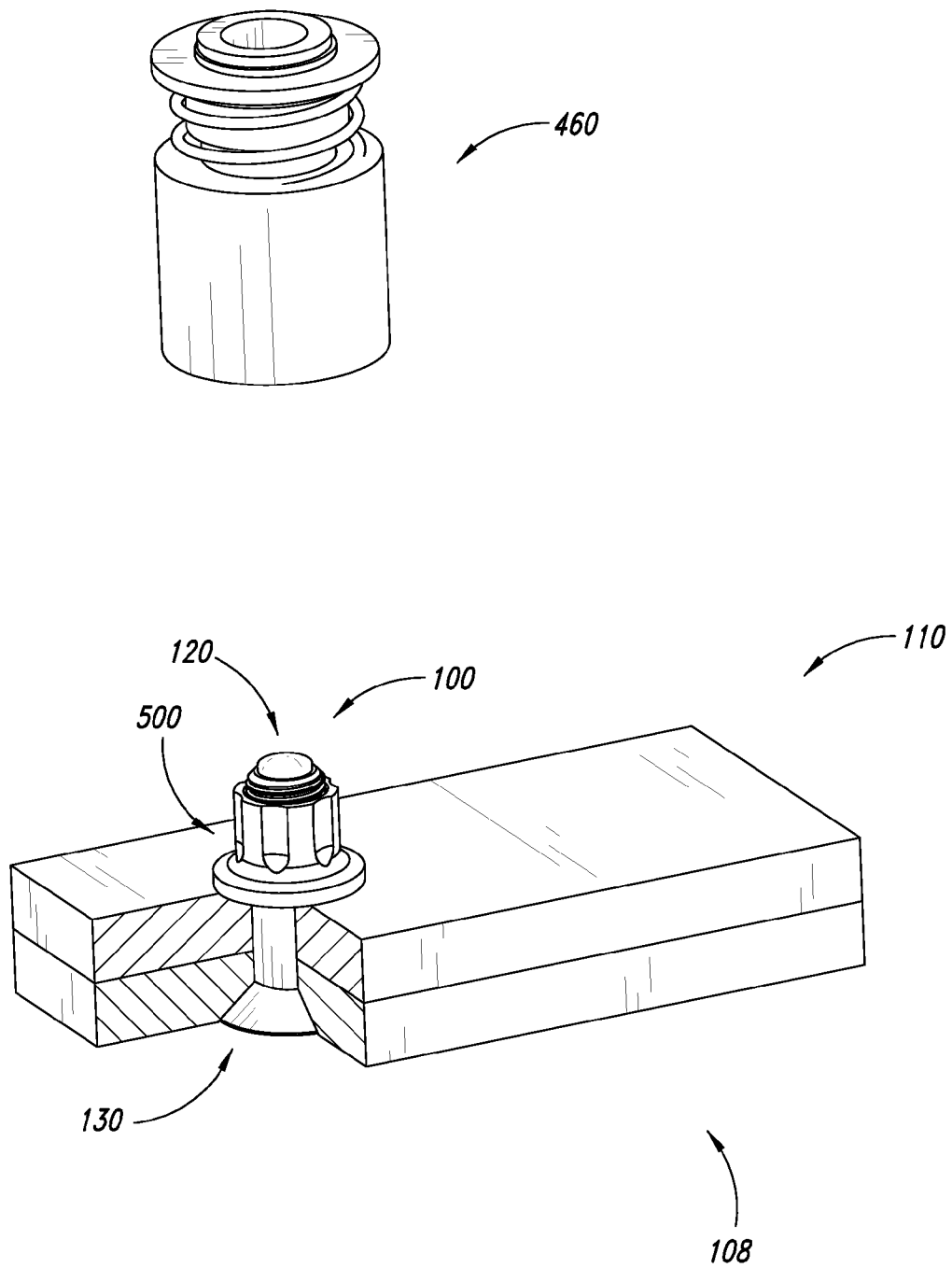
FIG. 17 shows the swaging assembly separated from the installed assembly, according to one illustrated embodiment.

FIG. 17 shows the installed assembly 100 and the swaging assembly 460 separated from the assembly 100. The swaging assembly 460 can be separated from the installed assembly 100 after the mandrel 150 is detached.

The installed fastener 120 can be conveniently removed without causing appreciable damage to the outer member 130 or the workpiece 110. Various lubricants can be applied between the stem 140 and the member 130 to facilitate removal of the fastener 120. In contrast, conventional thin-walled sleeve/bolt assemblies may tend to move together when the bolt is moved, thus resulting in unwanted damage to the workpiece, especially when the workpiece is made of a composite material.

After removing the fastener 120 of FIG. 17, another fastener or other component can be installed in the outer member 130, if needed or desired. If the fastener 120 is removed, the outer member 130 can spring back (e.g., contract inwardly) slightly while maintaining an interference fit.

The assembly 100 can provide enhanced electrical conductivity through the workpiece, especially at joints of workpieces made of composite materials. High clamp-up forces ensure that multi-component workpieces are held together during service. Various types of substances (e.g., lubricants) can be applied to the assembly 100 to facilitate installation and/or enhance performance. For example, the outer member 130 and/or fastener 120 can be passivated and dry film lubed. The passivated surfaces can provide electrical insulation between the components of the assembly 100. The dry film lube can reduce the forces required to install the assembly 100.

The assembly 100 can produce a wide range of fits, including high interference fits to low interference fits. A high interference assembly 100, for example, can be configured for a high level of retention to, for example, reduce, limit, or substantially prevent migration of the installed outer member 130 and/or fastener 120. The amount of spring back of the outer member 130 after over-expansion can be controlled to provide a sufficient amount of interference to minimize, limit, or substantially prevent migration of the outer member 130. The outer member 130 tends to spring-back from its maximum expanded configuration during the expansion process to an unrestrained configuration (that is, the intermediate expanded configuration as the separable portion 160 passes through the outer member 130). The stem 140 is pulled into the outer member 130 to produce a relatively high amount of interference. A low interference assembly 100 can have a sufficient amount of interference to limit or substantially prevent unwanted migration with respect to the workpiece while keeping strains in the workpiece at or below an acceptable level. Low interference assemblies are well suited for installation in low strain workpieces, such as composite workpieces which may be damaged when subjected to high strains.

The workpiece 110 may comprise a wide range of different materials, including metals, polymers, composite materials, or combinations thereof, even materials that are susceptible to damage due to high strains. Composite materials may include two or more materials with significantly different properties, such as physical properties (e.g., mechanical properties, electrical properties, etc.), chemical properties, or the like. For example, composite materials may include, without limitation, reinforcing elements (e.g., fibers, particles, and the like), fillers, binders, matrix, and the like. Wood, fiberglass, polymers, plastics, metals, ceramics, glass, or the like can be combined to produce one or both of the illustrated composite panels 112, 114 with properties that are different from the properties of its constituents individually. In some embodiments, the workpiece 110 can comprise a fiber-reinforced composite, a particle-reinforced composite, a laminate (e.g., a stack of laminas), or combinations thereof. The matrix of the reinforced composites can be made of metal, polymers, ceramics, and other suitable materials for encapsulating other reinforcement features. The laminates can be unidirectional laminates, cross-ply laminates, angle-ply laminates, symmetric laminates, and the like.

To minimize, limit, or substantially prevent damage to the workpiece material surrounding the opening 170, the amount of radial expansion can be below a threshold amount of expansion that would cause unwanted damage, such as micro-cracking, buckling of fibers, and the like, of the workpiece 110. If the compressive loading is too high, fibers in a fiber-reinforced composite material can buckle, which in turn affects the material's properties. Micro-buckling of fibers may significantly reduce the water resistance of the composite material because buckled fibers may cause micro-cracking of the matrix surrounding the fibers. Splitting due to Poisson's ratio effect, matrix yielding, fiber splitting, de-bonding (e.g., fiber de-bonding, interlaminate de-bonding, and the like), and other failure modes are often caused by compressive loading or high strains. Advantageously, the assembly 100 can be installed using sufficiently low levels of strain to control the amount of damage, if any, to the workpiece 110. For example, the outer member 130 in an un-expanded state can be installed with a clearance fit or a slight interference fit, as well as other types of fits, until the fastener 120 expands the outer member 130. The assembly 100 can be installed with a slight interference fit between components or other types of fits that keep the assembly 100 fixed to the workpiece 110. Thus, outwardly directed compressive forces can be applied to the workpiece 110 without compromising the structural integrity of the workpiece 110.

Installation can be accomplished with both the fastener 120 and the member 130 at substantially the same temperature. In some embodiments, a difference, if any, of the average temperature of the outer member 130 and the average temperature of fastener 120 is less than about 10 degrees Celsius. In some embodiments, for example, the average temperature of the fastener 120 can be within about 5 degrees Celsius of the average temperature of member 130. This eliminates the need to freeze or heat one of the assembly components, which reduces installation complexity, time, and costs. Thermal processes can also lead to the formation of a condensate, which in turn leads to corrosion of the final installation.

Figure 18:
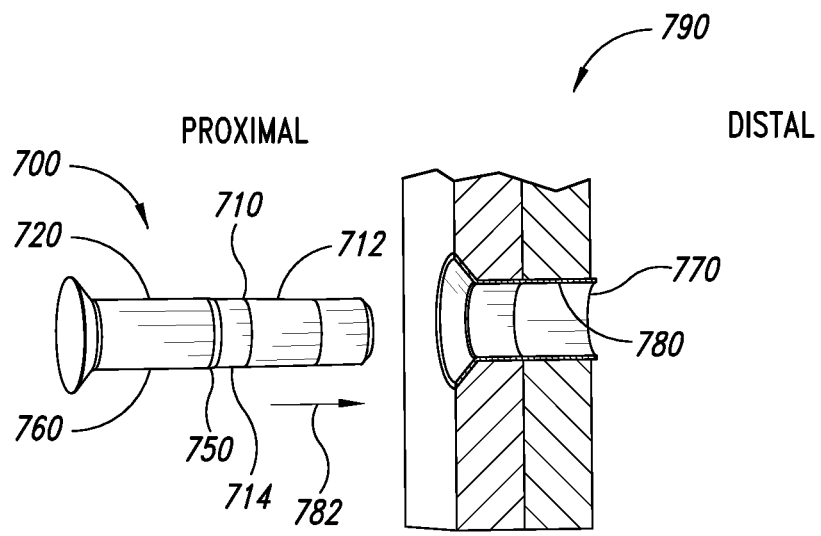
FIG. 18 is a pictorial view of a fastener spaced apart from an expandable outer member positioned in an opening of a multi-component workpiece. The outer member and workpiece are shown in cross-section.

FIG. 18 shows a non-frangible fastener 700 that includes a mandrel 710 connected to a stem 720. The mandrel 710 includes an expansion portion 712 and a contraction portion 714. The stem 720 includes an expansion portion 750 and propping portion 760. The expansion portion 750 of the stem 720 is between the contraction portion 714 and the propping portion 760.

An expandable outer member 770 (shown in cross-section) is installed by inserting the fastener 700 into a passageway 780 of the outer member 770. The fastener 700 is pushed through the outer member 770 (indicated by an arrow 782) to expand the outer member 770. The stem 720 is moved into the outer member 770 to maintain a desired fit between the outer member 770 and a workpiece 790.

Figure 19:
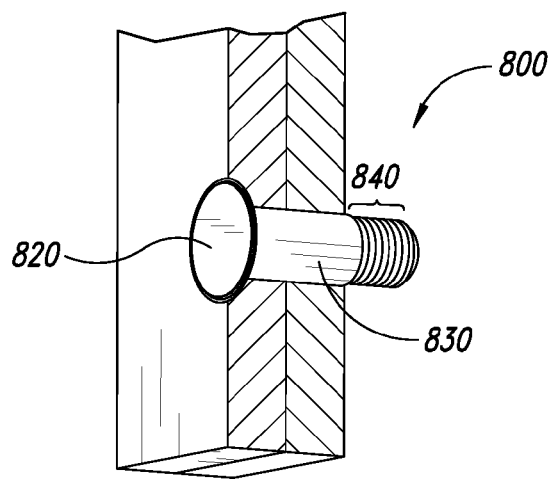
FIG. 19 is a pictorial view of a threaded fastener protruding from an expandable member in a workpiece. The workpiece is shown in cross-section.
Figure 20:
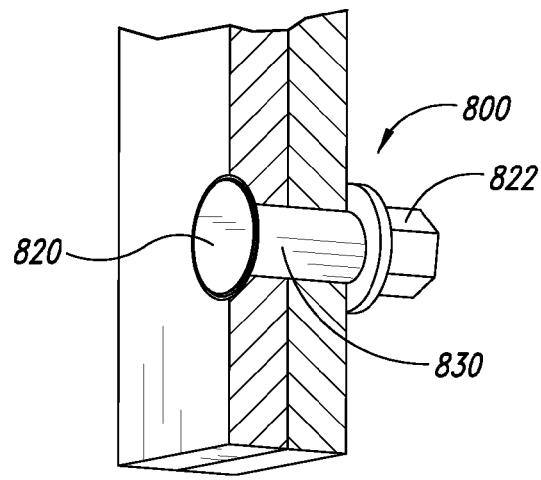
FIGS. 20 and 21 are pictorial views of a collar coupled to the threaded fastener of FIG. 19.
Figure 21:
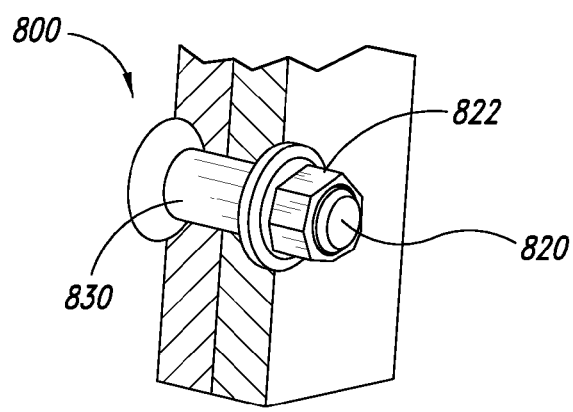

FIGS. 19-21 illustrate an assembly 800 including an outer member 830, a threaded fastener 820, and a threaded collar 822 (not shown in FIG. 19) coupleable to the fastener 820. The fastener 820 is shown after an integral mandrel has been removed. After the fastener 820 and the outer member 830 are installed, the collar 822 can be twisted onto a threaded coupling portion 840 of the fastener 820. The coupling portion 840 includes external threads that mate with internal threads of the collar 822. The collar 822 can be torqued to achieve the desired clamp-up forces. The installed collar 822 can also be removed to allow removal of the fastener 820.

Figure 22:
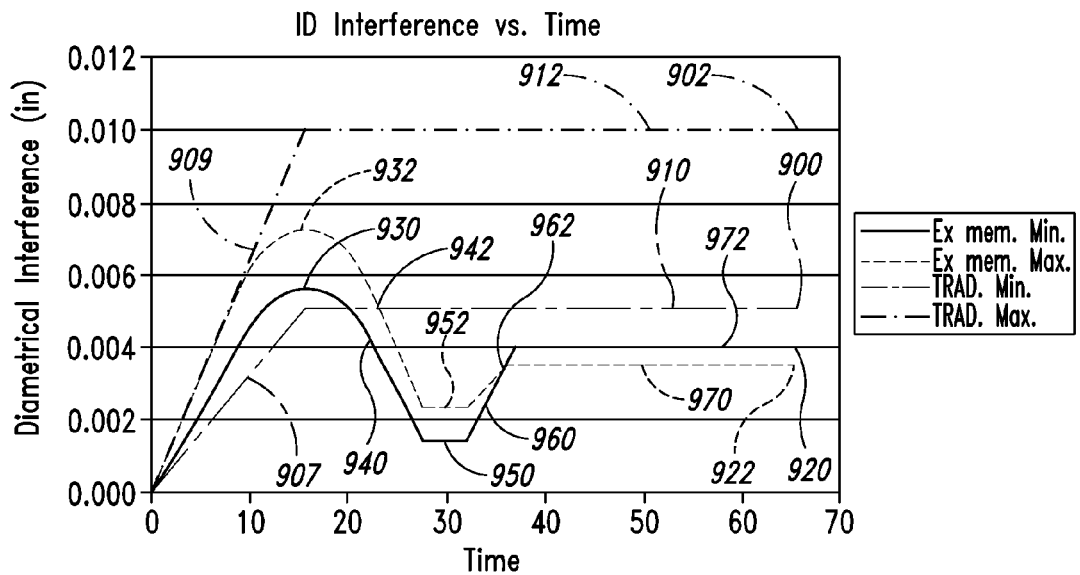
FIG. 22 is a graph showing inner diametrical interferences before and after installation.
Figure 23:
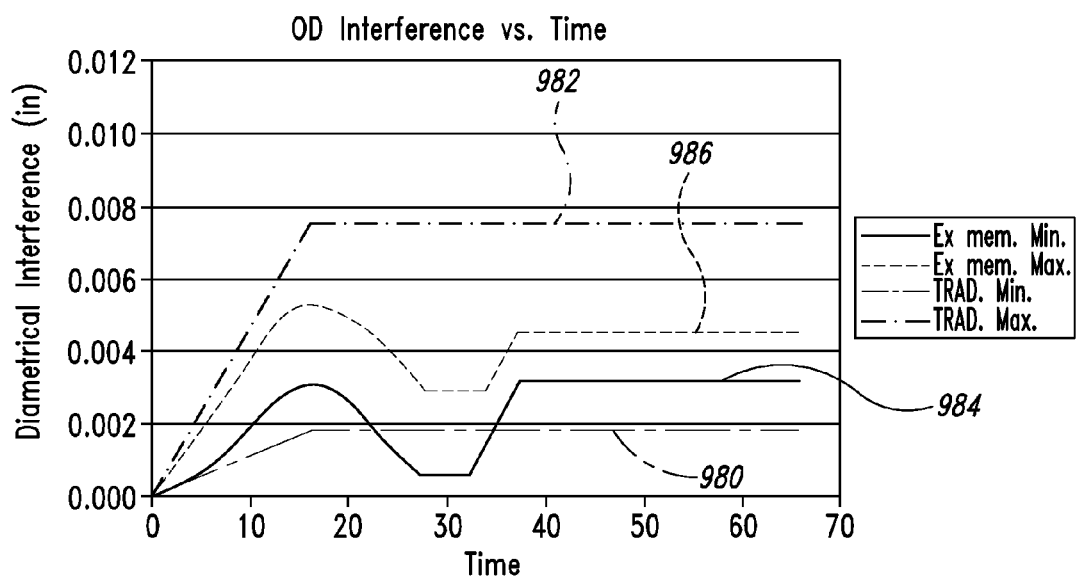
FIG. 23 is a graph showing outer diametrical interferences before and after installation.

FIGS. 22 and 23 show example interferences of one embodiment of an outer member of an assembly and example interferences of a conventional fastener. These graphs are discussed in connection with FIGS. 1-17. Generally, the mandrel 150 produces an initial relatively high interference fit between the outer member 130 and the workpiece 110 as the mandrel 150 expands the outer member 130. The interference fit is reduced to a relatively low interference fit as the outer member 130 relaxes to the intermediate expanded configuration. The stem 140 expands the outer member 130 to produce an installed interference fit between the outer member 130 and the workpiece 110. A ratio of the initial high interference fit to the installed interference fit is in a range of about 1.1 to about 3.

FIG. 22 is a graph that shows maximum and minimum interferences during installation of the assembly 100 and during installation of a conventional type sleeve/bolt assembly. Curve$_{min}$ 900, curve$_{max}$ 902 show minimum and maximum inner diameter interferences, respectively, during installation of the conventional fastener. Curve section$_{min}$ 907, curve section$_{max}$ 909 show the interference as the sleeve is expanded. Curve section$_{min}$ 910, curve section$_{max}$ 912 show the minimum and maximum inner diameter interferences, respectively, after the sleeve has been fully expanded. Conventional type sleeve/bolt assemblies are expanded at a constant rate until it reaches a final installed configuration. The high interference between the sleeve and bolt prevents removal of the bolt without damaging the workpiece or moving the sleeve.

Curve$_{min}$ 920, curve$_{max}$ 922 show inner diameter interferences of the outer member 130. The local maximums 930, 932 show the outer diameter interferences when the mandrel 150 has radially expanded the outer member 130 to the over-expanded configuration. Curve section$_{min}$ 940, curve section$_{max}$ 942 show the interferences as the over-expanded outer member 130 contracts. The local minimums 950, 952 show the interferences when the outer member 130 reaches the intermediate expanded configuration. An interference fit is maintained as the stem 140 is moved into the outer member 130. Curve section$_{min}$ 960, curve section$_{max}$ 962 show re-expansion of the outer member 130 by using the stem 140. Curve section$_{min}$ 972, curve section$_{max}$ 976 show the installed interferences of the installed assembly 100. The installed interference is less than the interference when the outer member 130 is over-expanded and greater than the interference when the outer member is in the intermediate expanded configuration. In some embodiments, the installed interference is at least 5% greater than the interference at the minimums 950, 952 and less than about 95% of interference at the local maximums 930, 932. In some embodiments, the installed interference is about half of the local maximum interference. The difference between the curve section$_{min}$ 910, curve section$_{max}$ 912 of conventional sleeve/bolt assemblies is greater than a difference between the curve section$_{min}$ 972, curve section$_{max}$ 976 of the assembly 100. The tighter tolerance provided by the assembly 100 provides consistent and reliable installations. The lower interference also allows for convenient removal of the fastener 120.

FIG. 23 is a graph that shows maximum and minimum outer diameter interferences for the outer member 130 and the conventional sleeve/bolt assembly. Curve$_{min}$ 980, curve$_{max}$ 982 show outer diameter interferences during and after expansion of the conventional sleeve/bolt assembly. Curve$_{min}$ 984, curve$_{max}$ 986 show an outer diameter interference of the outer member 130 during and after expansion. After installation, the difference between the curve$_{min}$ 982, curve$_{max}$ 980 is significantly greater than a difference between the curve$_{min}$ 986, curve$_{max}$ 984. Once again, the tighter tolerances provide for consistent and reliable installations.

By knowing the final dimensions of the installed assembly, a desired amount of radial interference between the outer member 130 and the fastener 120 may be selected. It is understood that the fastener 120, the member 130, and/or the opening 170 in the workpiece 110 may have generally circular cross-sections or non-circular cross-sections. It is generally understood that when components are assembled with an "interference fit," a contact pressure is present between the components after assembly.

Figure 24:
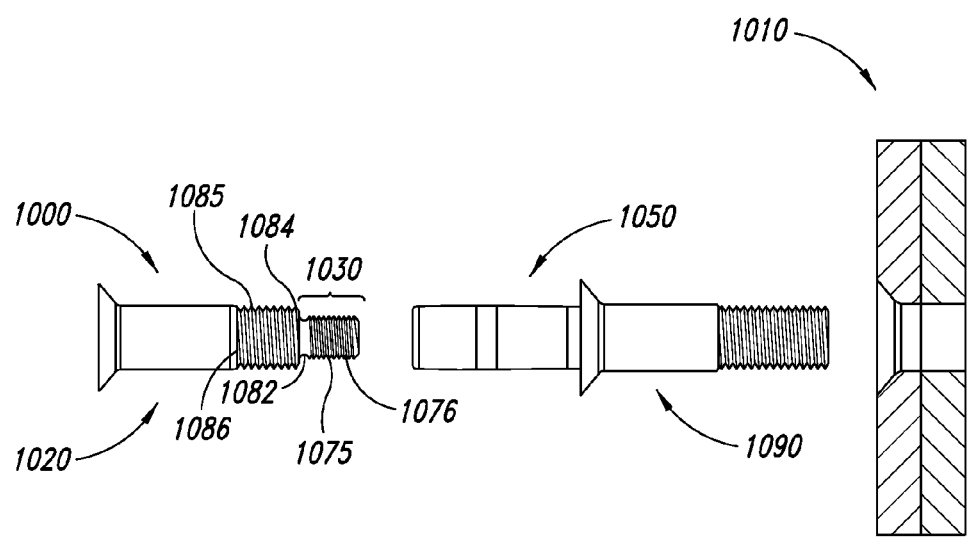
FIG. 24 is an exploded view of a fastener for installing an outer member in a workpiece. The outer member is positioned over the fastener. The workpiece is shown in cross-section.
Figure 25:
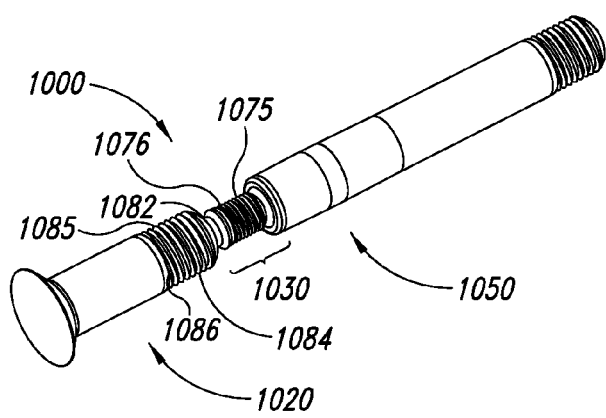
FIG. 25 is an isometric view of the fastener of FIG. 24.

FIGS. 24-25 show a fastener 1000 that includes a stem 1020, a separable portion 1030, and a mandrel 1050. The separable portion 1030 includes a coupler 1075 that can be receive by and coupled to the mandrel 1050. The coupler 1075 includes external threads 1076 for threadably coupling to internal threads of the mandrel 1050. A narrowed portion 1082 is positioned between the threads 1076 and an end 1084 of the stem 1020. To install an outer member 1090, the mandrel 1050 can be twisted onto the coupler 1075. The outer member 1090 is then installed in a workpiece 1010. The mandrel 1050 is then separated from the stem 1020 by breaking the narrowed portion 1082. The portion of the coupler 1075 in the mandrel 1050 can be removed from the mandrel 1050 (e.g., by hand or by using tools).

The fastener 1000 includes a threaded region 1085 between the end 1084 and an expansion portion 1086. The threaded portion 1085 can protrude outwardly from the workpiece 1010 such that a nut or other threaded member can be torqued down over the threaded region 1085 to provide relatively high clamp up forces. In other embodiments, the fastener 1000 has a non-threaded stem 1020.

Figure 26:
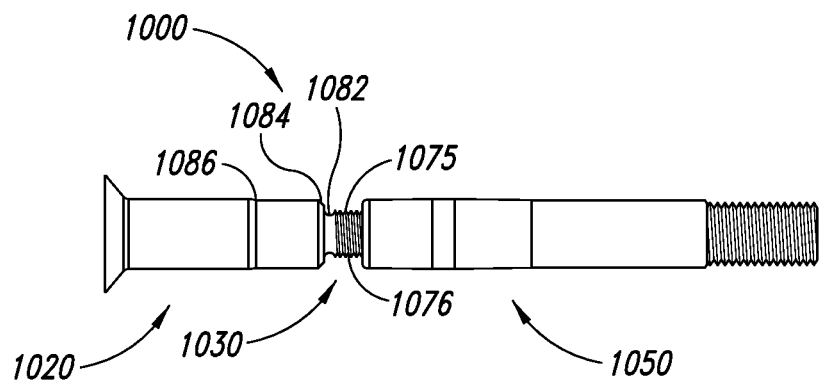
FIG. 26 is a side elevational view of the fastener of FIG. 24 with a mandrel coupled to a stem.

FIG. 26 shows a fastener 1000 that is generally similar to the fastener 1000 of FIGS. 24 and 25. The stem 1020 of FIG. 26 has a non-threaded region extending between the end 1084 and the expansion portion 1086.

Figure 27:
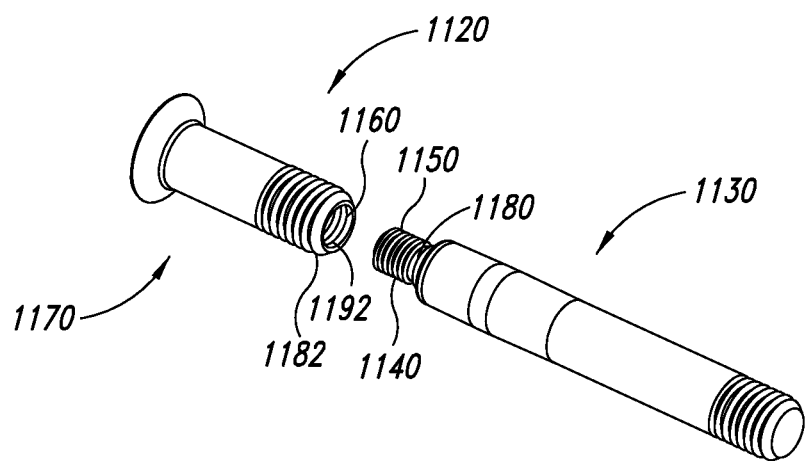
FIG. 27 is an exploded isometric view of a fastener with a stem and a mandrel with a coupler coupleable to the stem.

Referring to FIG. 27, a fastener 1120 has a mandrel 1130 that includes a breakaway coupler 1140. The breakaway coupler 1140 is generally similar to the coupler 1075 of FIGS. 24-26. The breakaway coupler 1140 has external threads 1150 that threadably couple to internal threads 1160 of a stem 1170.

Figure 28:
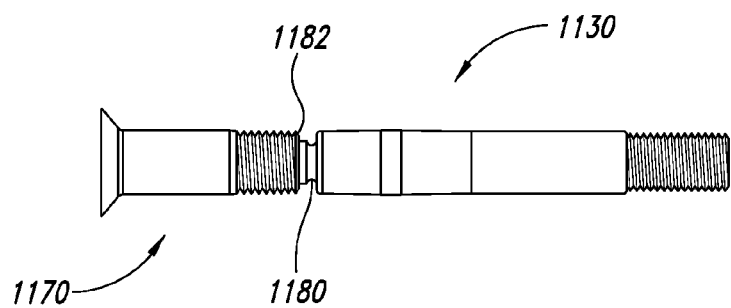
FIG. 28 is a side elevational view of the fastener of FIG. 27 assembled.

FIG. 28 shows the mandrel 1130 assembled with the stem 1170 such that a narrowed portion 1180 is adjacent to an end 1182 of the stem 1170.

The narrowed portion 1180 can be broken to separate the mandrel 1130 from the stem 1170. The breakaway coupler 1140 can then be left in the stem 1170 or removed.

Figure 29:
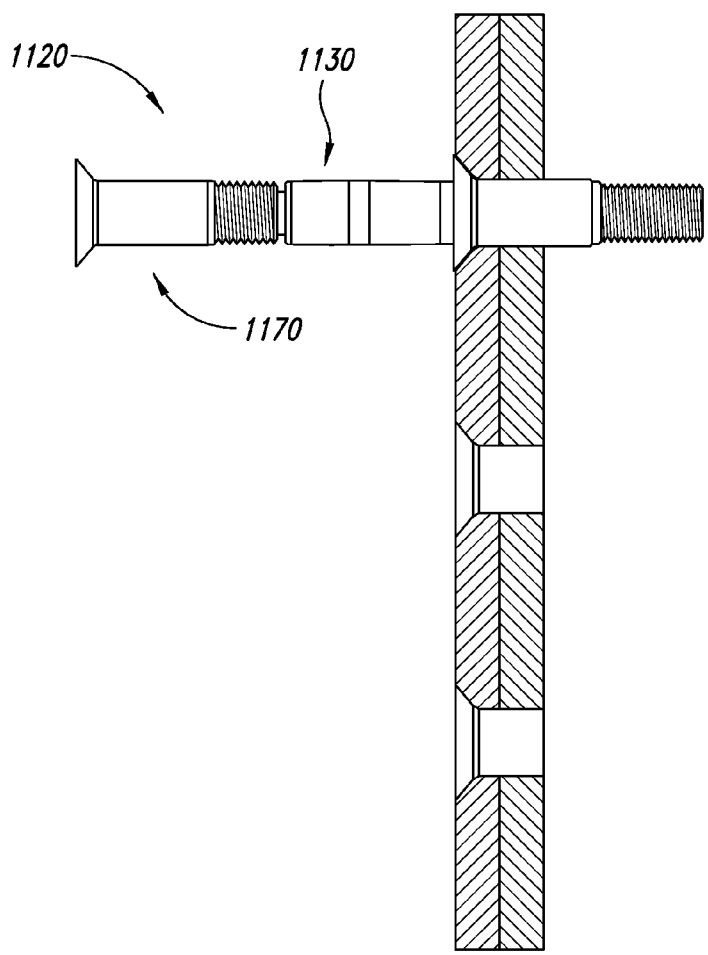
FIG. 29 is a side elevational view of the fastener of FIG. 27 ready to install an outer member.

FIG. 29 shows the fastener 1120 assembled such that the narrowed portion 1180 is within the stem 1170. The narrowed portion 1180 can be, for example, within an opening 1192 (see FIG. 27). Accordingly, the fracture surface can be within or proximate to the end of the stem 1170.

Figure 30:
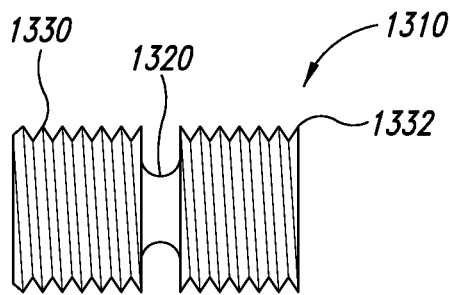
FIGS. 30-32 are side elevational views of couplers.

A wide range of different types of couplers can be used to couple together fastener components. FIG. 30 shows a coupler 1310 that includes a narrowed portion 1320 between two engagement portions 1330, 1332. The engagement portion 1330 can be received within a stem. The engagement portion 1332 can be received within a mandrel. The narrowed portion 1320 can break apart to separate the stem and mandrel. The engagement portions 1330, 1332 can then be removed from respective components to reuse those components, if needed or desired.

Figure 31:
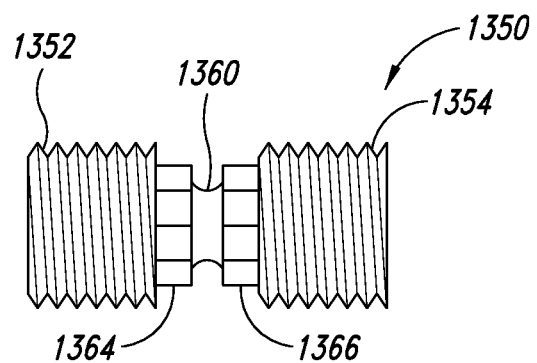

Couplers can also be configured to facilitate removal. FIG. 31 illustrates a coupler 1350 with tool engagement regions. In the illustrated embodiment, each of the engagement portions 1352, 1354 includes a tool engagement region 1364, 1366 in the form of a hexagonal head or wrench flats used to apply torque. A narrowed portion 1360 is between the tool engagement regions 1364, 1366.

Figure 32:
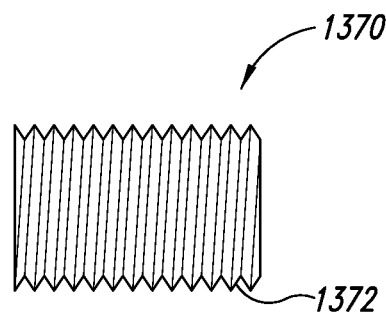

FIG. 32 shows a coupler 1370 in the form of an externally threaded rod. External threads 1372 can be threadably coupled to other fastener components. For example, one end of the coupler 1370 can be coupled to a stem and another end of the coupler 1370 can be threadably coupled to a mandrel.

The various embodiments described above can be combined to provide further embodiments. The couplers, mandrels, fasteners and other components and features disclosed herein can be mixed and matched based on the desired installation. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An assembly installable in an opening of a workpiece, comprising:
   an outer member having a passageway; and
   a fastener movable through the passageway, the fastener including:
      a mandrel dimensioned to radially expand the outer member,
      a stem including an expansion portion and a propping portion, the expansion portion configured to radially expand the outer member after at least a portion of the outer member has been expanded by the mandrel, and
   a separable portion between the mandrel and the stem,
   wherein the mandrel has a maximum outer diameter that is greater than an outer diameter of the propping portion such that an initial interference fit between the outer member and the workpiece is produced as the mandrel expands the outer member and an installed interference fit between the outer member and the workpiece is maintained by the propping portion within the outer member, and a ratio of the initial interference fit to the installed interference fit is in a range of about 1.25 to about 3.

2. The assembly of claim 1, wherein the mandrel is configured to expand the outer member from an initial configuration to an over-expanded configuration and to allow contraction of the outer member from the over-expanded configuration to a relaxed intermediate expanded configuration, and the expansion portion of the stem is configured to radially expand the outer member from the relaxed intermediate expanded configuration to an installed expanded configuration.

3. The assembly of claim 1, further comprising a threaded collar coupleable to a threaded portion of the fastener.

4. The assembly of claim 1, wherein the separable portion includes a narrowed region adapted to break to separate the stem from the mandrel upon application of a sufficient axial load to the fastener.

5. The assembly of claim 1, wherein the mandrel comprises an expansion section, a contraction section, and a major cylindrical section between the expansion section and the contraction section, the major cylindrical section has a substantially constant outer dimension along its length.

6. The assembly of claim 5, wherein the expansion section tapers away from the major cylindrical section towards an end of the fastener, and the contraction section tapers away from the major cylindrical section towards the separable portion.

7. The assembly of claim 1, wherein the expansion portion includes a minimum outer dimension, a maximum outer dimension, and a transition outer dimension extending therebetween so as to define a sloped expansion surface.

8. An assembly installable in an opening of a workpiece, comprising:
  an outer member having a passageway; and
  a fastener movable through the passageway, the fastener including:
    a mandrel dimensioned to radially expand the outer member,
    a stem including an expansion portion and a propping portion, the expansion portion configured to radially expand the outer member after at least a portion of the outer member has been expanded by the mandrel, and
    a separable portion between the mandrel and the stem,
  wherein the mandrel comprises an expansion section, a contraction section, and a major cylindrical section between the expansion section and the contraction section, the major cylindrical section has a substantially constant outer dimension along its length
  wherein at least one of a contraction angle of the contraction section and an expansion angle of the expansion section is less than or equal to about 5 degrees.

9. The assembly of claim 8, wherein both the contraction angle and the expansion angle are less than 3 degrees.

10. A fastener, comprising:
  a mandrel including:
    an expansion section configured to radially expand an expandable outer member into a workpiece,
    a contraction section, and
    a major cylindrical section between the expansion section and the contraction section, both the expansion section and the contraction section tapering away from the major cylindrical section;
  a stem connected to the mandrel, the stem including:
    an enlarged head,
    a stem expansion section dimensioned and positioned to radially expand the outer member after the outer member has been expanded by the mandrel; and
    a propping portion between the enlarged head and the stem expansion section, the propping portion dimensioned to keep the outer member in an expanded configuration, wherein the expansion section of the mandrel defines an expansion angle of taper with respect to a longitudinal axis of the fastener, the contraction section defines a contraction angle of taper with respect to the longitudinal axis, and a ratio of the contraction angle of taper to the expansion angle of taper is in a range of about 0.7 to about 1.3.

11. The fastener of claim 10, further comprising a separable portion between the mandrel and the stem.

12. The fastener of claim 10, wherein the fastener has a unitary construction.

13. The fastener of claim 10, wherein the stem expansion section includes a minimum outer dimension, a maximum outer dimension, and a transition outer dimension extending therebetween so as to define a sloped expansion surface.

* * * * *